(12) United States Patent
Vuksanovic

(10) Patent No.: US 11,473,851 B2
(45) Date of Patent: Oct. 18, 2022

(54) SOLAR CONCENTRATOR, SOLAR RECEIVER AND THERMAL STORAGE

(71) Applicant: Storenergy Holdings Ltd., London (GB)

(72) Inventor: Marko Vuksanovic, London (GB)

(73) Assignee: Storenergy Holdings Ltd., London (GB)

( * ) Notice: Subject to any disclaimer, the term of this patent is extended or adjusted under 35 U.S.C. 154(b) by 0 days.

(21) Appl. No.: 17/186,201

(22) Filed: Feb. 26, 2021

(65) Prior Publication Data

US 2021/0254902 A1 Aug. 19, 2021

Related U.S. Application Data

(62) Division of application No. 16/342,636, filed as application No. PCT/EP2017/076189 on Oct. 13, 2017, now Pat. No. 10,976,113.

(30) Foreign Application Priority Data

Oct. 19, 2016 (GB) ..................................... 1617703

(51) Int. Cl.
*F28D 20/00* (2006.01)
*F24S 23/79* (2018.01)
*F24S 25/13* (2018.01)
*F24S 30/452* (2018.01)
*F03G 6/06* (2006.01)
*F24H 7/00* (2022.01)
*F24S 60/00* (2018.01)

(52) U.S. Cl.
CPC ........... *F28D 20/0056* (2013.01); *F03G 6/06* (2013.01); *F24H 7/005* (2013.01); *F24S 23/79* (2018.05); *F24S 25/13* (2018.05); *F24S 30/452* (2018.05); *F24S 60/00* (2018.05)

(58) Field of Classification Search
CPC ..... F28D 2020/0008; F28D 2020/0013; F28D 2020/0017; F28D 2020/0021; F28D 2020/0026; F28D 20/0052; F28D 20/0056; F03G 6/06; F24H 7/005; F24S 23/79; F24S 25/13; F24S 30/452; F24S 60/00
USPC .......................................................... 60/659
See application file for complete search history.

(56) References Cited

U.S. PATENT DOCUMENTS

| | | | | |
|---|---|---|---|---|
| 3,977,197 A | * | 8/1976 | Brantley, Jr. | ........... F28D 20/00 60/659 |
| 4,215,553 A | * | 8/1980 | Poirier | ...................... F02C 1/05 165/104.34 |
| 2009/0090109 A1 | * | 4/2009 | Mills | ....................... F24T 10/30 60/659 |
| 2011/0200157 A1 | * | 8/2011 | Hyde | ........................ F01K 3/00 376/322 |

(Continued)

*Primary Examiner* — Mickey H France
(74) *Attorney, Agent, or Firm* — Hunton Andrews Kurth LLP

(57) ABSTRACT

A solar concentrator comprising: a base; a framework, the framework being hingedly joined to the base such that the framework can be rotated relative to the base; and a plurality of mirrors arranged relative to a first axis of the framework, such that all of the mirrors are located on one side of a plane which contains the first axis, each mirror being fixed to the framework and each mirror being arranged to reflect light travelling parallel to the first axis towards a common focus which lies on the first axis.

13 Claims, 31 Drawing Sheets

(56) References Cited

U.S. PATENT DOCUMENTS

| | | | |
|---|---|---|---|
| 2013/0104549 A1* | 5/2013 | Stiesdal | F28F 27/02 60/659 |
| 2015/0300751 A1* | 10/2015 | Koschnitzke | F28D 20/00 165/10 |
| 2017/0276435 A1* | 9/2017 | Papadopoulos | F28D 20/02 |

* cited by examiner

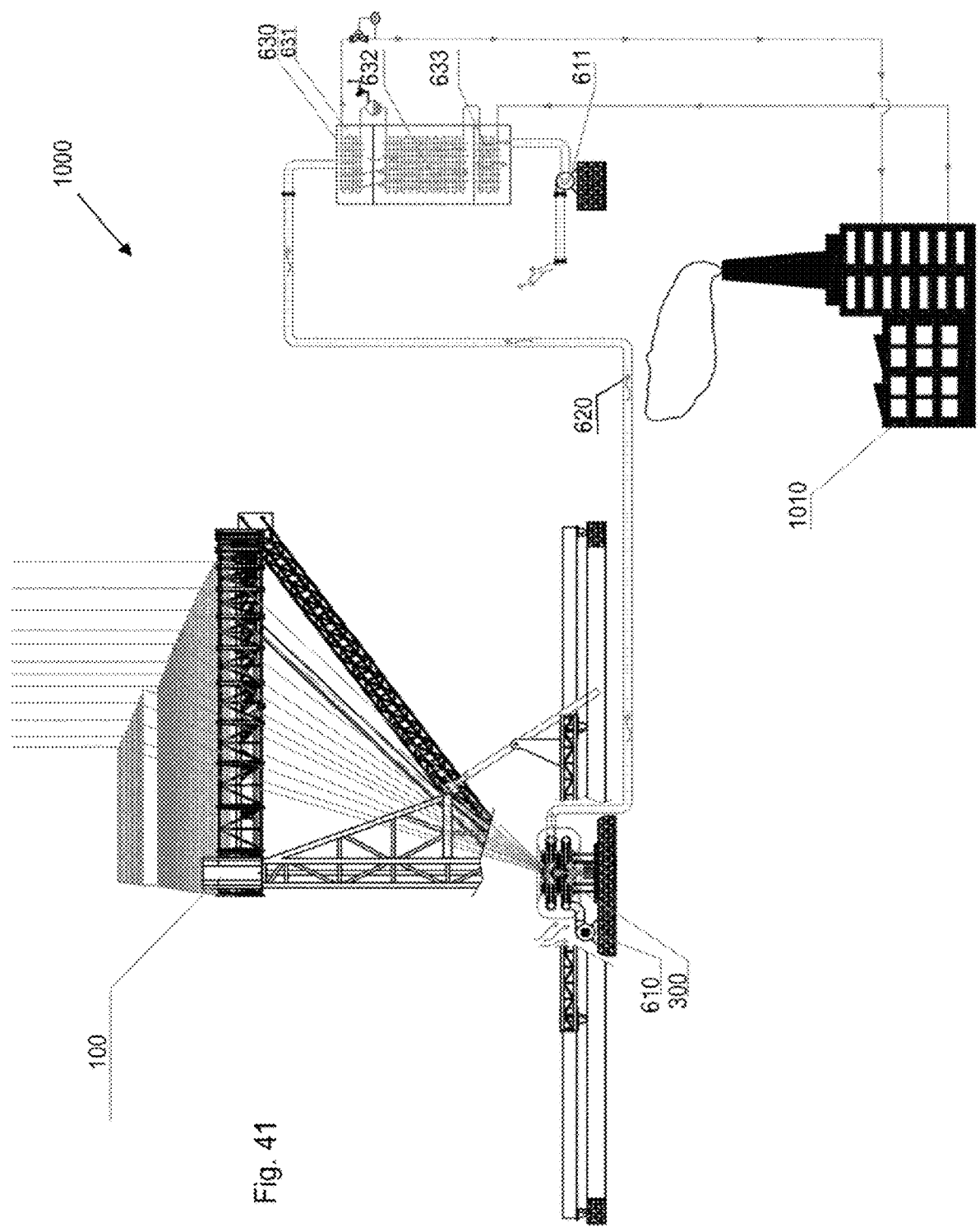

SOLAR CONCENTRATOR, SOLAR RECEIVER AND THERMAL STORAGE

CROSS-REFERENCE TO RELATED APPLICATIONS

This application is a divisional application of U.S. patent application Ser. No. 16/342,636, filed Apr. 17, 2019, which is a national phase of PCT/EP2017/076189, filed Oct. 13, 2017, which claims priority to GB 1617703.2, filed Oct. 19, 2016. The aforementioned applications are incorporated in their entirety.

BACKGROUND

With rising concern over the environmental damage being done by traditional power generating technologies, it has become more important than ever to develop alternatives. Solar power is an attractive solution, since energy such as thermal energy can be collected without ongoing pollution simply by harnessing the sun. That energy can then be used either directly or to generate electricity.

However solar technologies present a number of technical challenges. Firstly, the sun is a constantly moving target in the sky, and tracking the sun in order to provide the most power from minute to minute can be difficult. Secondly, methods for collecting solar energy often rely upon expensive materials which can be difficult to work with. Lastly, solar energy must be collected while the sun is shining, but power or heat may be needed at other times such as during the night, so storing energy for later use is often necessary.

Concentrating Solar Power (CSP) systems generate solar power by gathering and concentrating sunlight from a large area using mirrors or lenses. A CSP system typically comprises concentrators, receivers, power blocks, and thermal storages. The concentrators, which are also called collectors, are the mirrors or lenses which focus sunlight onto a receiver. The sunlight heats the receiver, and heat from the receiver is either used to generate power such as electrical power using the power block, or stored in a thermal storage.

Based on the type of concentrators and on the way in which the solar energy is concentrated, CSP systems can be divided into linear focus systems and point focus systems. In a linear system the sun's rays are concentrated into a line using a linear parabolic concentrator or a linear Fresnel concentrator. In a linear system tracking, i.e. following the position of the Sun, is done by rotating the concentrators around one axis.

Point focus systems concentrate the sun's rays onto a point using a solar dish, solar tower, Fresnel ring concentrator or similar. Due to the higher concentration factor, point focus systems can produce a much higher temperature than linear systems. However, in order to maintain those high temperature, a point focus system must follow the Sun's position by rotating around two axes.

Some point focus systems use a fixed focus, meaning that the point of focus remains stationary while the system moves to track the sun. Examples of such systems include a beam down tower, a fixed point focus Fresnel concentrator, a solar furnace with tertiary mirror and a Scheffler dish.

In order to produce high temperatures, concentrators are necessarily large. As a result, the collector will typically take between 40% and 60% of the costs of a CSP system. It is desirable to produce concentrators which are manufactured with a high degree of precision, so that a focus is small and high temperatures can be achieved, and to produce concentrators with a long life span in order to reduce the maintenance and replacement costs of the CSP system.

Many CSP systems make use of a steam turbine to produce electricity. The efficiency of this process depends in large measure on the heat of the steam produced. The greater the temperature difference which can be created, the greater the efficiency. Therefore it is often desirable to achieve as high a temperature as possible in a solar receiver, in order to increase the efficiency of electricity production. As a result, the components of the receiver must be able to work at high temperatures. The working temperature in receivers at commercially available CSP plants range from 350° C. to 550° C.

CSPs can use working fluids in order to collect and transport heat. The working fluids collect heat in the solar receiver of the CSP, and are then transported to a power block or thermal storage. In a power block, the working fluids are typically used to produce steam. Thermal oils and molten salt are the most widely used working fluids. However thermal oils can only work up to 400° C., and molten salts can only work up to 600° C.

Where the energy collected by a CSP plant is not used immediately, it can be stored as heat in a thermal storage, for later use during a consumption peak. Commonly, the heat is stored in molten salts. There are two commonly available solutions; indirect accumulation in salts and direct accumulation in salts.

Indirect accumulation in salts may use nitrate salts. The working fluid may be a thermal oil which is heated up to 400° C. as described above. The oil goes through an exchanger and heats up the nitrate salts to up to 380° C. The salts are then stored in a tank until they are needed to be used. When heat is required from the thermal storage, the salts are sent through another heat exchanger and used to heat water for the production of steam, so that the steam can be used to produce electricity, or for direct heating, or in whatever other way is desired.

Direct accumulation uses the molten salt as a working fluid. The molten salt is initially stored in a "cold" tank at around 230° C. to 280° C., and typically at 250° C. If the salt drops below this range it may solidify, which prevents the salt being circulated through the CSP. To store heat, the salt is pumped through a receiver in the CSP plant and heated up to 560° C. before being stored in a "hot" tank. When the heat is needed, the molten salts from the hot tank are put through a heat exchanger to produce steam and then stored again in the cold tank.

The salts and thermal oils being used in storage systems are expensive, and salts often make up more than half of the total cost of a thermal storage. In addition, both thermal oils and molten salts are difficult to contain and potential pollutants if there is a leak in a CSP plant.

Also, any solid components used in a storage system can be subject to crushing, where the materials break apart due to the stress brought on by temperature changes. Crushing can be disadvantageous since it may affect and obstruct the flow of fluid through a thermal storage.

It is an object of embodiments of the invention to at least mitigate one or more of the problems of the prior art.

SUMMARY OF THE INVENTION

In accordance with an aspect of the present invention there is provided a solar concentrator comprising: a base; a framework, the framework being hingedly joined to the base such that the framework can be rotated relative to the base; and a plurality of mirrors arranged relative to a first axis of the framework, each mirror being fixed to the framework and each mirror being arranged to reflect light travelling parallel to the first axis towards a common focus which lies on the first axis. The mirrors are arranged such that the first axis can be directed substantially towards the horizon of a ground plane by rotating the framework relative to the base while the base is rested on that ground plane.

In this way there is provided a solar concentrator in which light may be reflected by a plurality of mirrors towards a common focus. Since the framework is hingedly joined to the base, it can be moved to track the sun and hence maximise the amount of solar energy which is concentrated at the focus. In use, typically, the framework will be arranged so that the sun lies on the first axis. Since the first axis can be directed substantially towards the horizon, it is possible to direct the first axis at the sun when it is close to the horizon, such as early in the morning or late in the evening. This allows the solar concentrator to function efficiently early or late in the day.

In accordance with another aspect of the present invention there is provided a solar concentrator comprising: a base; a framework, the framework being hingedly joined to the base such that the framework can be rotated relative to the base; and a plurality of mirrors arranged relative to a first axis of the framework, such that a majority of the area of the reflective surfaces of the mirrors is located on one side of a plane which contains the first axis, each mirror being fixed to the framework and each mirror being arranged to reflect light travelling parallel to the first axis towards a common focus which lies on the first axis.

In this way there is provided a further solar concentrator in which light may be reflected by a plurality of mirrors towards a common focus. Again, in typical use, the framework will be arranged so that the sun lies on the first axis. When the solar concentrator is located on a flat, level surface it is possible to direct the first axis close to the horizon, since a majority of the reflective surface area of the mirrors is located on one side of a plane and hence at least the majority of the mirrors will not be obstructed by the surface. This can be beneficial when using the solar concentrator to gather energy from the sun early in the morning or late in the evening, when the sun is close to the horizon.

It may be that all of the mirrors are located on one side of a plane which contains the first axis. In this case, it is possible to direct the first axis very close to the horizon, since the mirrors are all located on one side of a plane and hence will not be obstructed by the surface.

The design of the collar concentrator can be sturdy and self-contained. The mirrors for example are fixed to the framework, and need not move relative to the framework or to each other in normal use. Typically, the common focus lies within the framework.

It may be that the plurality of mirrors comprises: a first mirror, the first mirror being arranged a first distance from the closest part of the first axis; and a second mirror, the second mirror being arranged a second distance from the closest part of the first axis, the second distance being greater than the first distance such that there is a gap between the first mirror and the second mirror. The second mirror comprises a primary region and is arranged such that light travelling parallel to the first axis which is reflected by the second mirror will pass through the gap between the first mirror and the second mirror before reaching the common focus.

It may be that all, or substantially all of the light which is reflected by the second mirror also passes through the gap between the first mirror and the second mirror before reaching the common focus. The second mirror may comprise a secondary region, where light travelling parallel to the first axis which is reflected by the secondary region of the second mirror will reach the common focus without passing through the gap between the first mirror and the second mirror.

It may be that light travelling parallel to the first axis is first reflected by the second mirror and then passes through the gap between the first mirror and the second mirror. It may be that light travelling parallel to the first axis first passes through the gap between the first mirror and the second mirror and is then reflected by the second mirror. It may be that light travelling parallel to the first axis is reflected by the second mirror while it is passing through the gap between the first mirror and the second mirror.

The common focus may be a point, but more typically the common focus is an area which may for example be a fraction of a metre across.

It may be that the plurality of mirrors further comprises a third mirror, the third mirror being arranged a third distance from the closest part of the first axis, the third distance being greater than the second distance such that there is a gap between the second mirror and the third mirror. The third mirror may comprise a primary region, and be arranged such that light travelling parallel to the first axis which is reflected by the primary region of the third mirror will pass through the gap between the second mirror and the third mirror before reaching the common focus. There may further be a fourth mirror, a fifth mirror and so on up to as many mirrors as are needed, each successive mirror being arranged such that it is further from the first axis than the last mirror, and so that light travelling parallel to the first axis which is reflected by the primary region of a mirror will pass between the mirror and the last mirror before reaching the common focus.

It may be that at least one of the plurality of mirrors is curved. It may be that at least one of the mirrors describes an arc centred on the first axis. It may be that at least one edge of the curved mirror is arranged so that it is a constant distance from the closest part of the first axis.

Typically, two or more of the mirrors are arranged in a first arc centred on the first axis. Where this is the case, it may be that two or more of the mirrors are arranged in a second arc, centred on the first axis. As such, the mirrors may form a plurality of concentric arcs. Each arc may be a circle or a segment of a circle, for example a semi-circle.

The mirrors are typically tilted or curved so that they are closer to the first axis at one edge than they are at another, so that they will reflect light towards the common focus as desired. Therefore, an arc of mirrors, or an arc formed by a single mirror, may describe the outside of a truncated cone such as a conical frustum, or a segment of such a truncated cone.

It may be that the framework is located on one side of a plane which contains the first axis.

It may be that the base can rotate. Typically the base will rotate about a third axis. The third axis may pass through the common focus. The third axis may be substantially normal to a plane on which the base rests, in use. The base may comprise wheels, on which it can be moved. Rotating the base can be helpful in tracking the sun across the sky. For example, as the sun rises the framework may rise up relative to the base to track the sun. Then, as the sun begins to set, the base can rotate so that the framework can be lowered and continue to track the sun. In some embodiments, the framework may be arranged so that it can rotate with respect to the base about two axes.

Typically, at least one mirror comprises an aluminium plate. It may be that the mirrors comprise no glass. The plate may be between 0.5 and 1 mm thickness.

The solar concentrator may further comprise a motor, the motor arranged to move the framework with respect to the base. The motor may be arranged to rotate the base too, or a further motor may be provided for this purpose. The motor may be arranged as part of a hydraulic aggregate to drive a pump and hence operate a hydraulic cylinder.

It may be that the framework is hingedly joined to the base such that the framework can be rotated around a second axis. It may be that the second axis is coincident with the common focus. In such an embodiment, moving the framework would not move the common focus relative to the base. If both axes pass through the common focus, and all rotation is around one axis or the other, then the common focus will stays in substantially one location relative to the base regardless of how the framework is moved.

It may be that the second axis is substantially parallel to the plane which contains the first axis. It may be that the second axis lies within the plane which contains the first axis.

In accordance with a further aspect of the present invention, there is provided a method of constructing a solar concentrator, the method comprising: building a framework according to a design; measuring deviations in the framework from the design; cutting at least one opening in the framework according to the measured deviations; and fixing a mirror to the opening.

In this way there is provided a method which can compensate for early deviations in the construction of a framework. The position, width, length and depth of an opening cut into the framework can be adjusted to provide a precise position of the mirror.

Typically, the framework comprises at least a first component and a second component, the first component being welded to the second component. Since welding can be an imprecise construction process, it may produce errors in the position of the first component or the second component which can then be compensated for by the position and depth of the openings.

It may be that fixing a mirror to the opening comprises fixing at least a first support to the opening, a mirror being fixed to the first support. Alternatively, the mirror may comprise at least one integral supports which is fixed to the opening.

Where the method comprises fixing at least a first support to the opening, the method may further comprises constructing at least one first support with dimensions according to the measured deviations. In this way, the deviations can be corrected by the first support.

The mirror may be attached to the first support after the first support is fixed to the opening. Alternatively, the mirror may be fixed to the first support before the first support is fixed to the opening.

It may be that the first support comprises a rack, a plurality of mirrors being fixed to the rack. Each mirror may be supported by a plurality of supports, for example each mirror may be supported by a plurality of racks.

It may be that the framework comprises at least one panel, the method comprising cutting at least one opening in the panel. The framework may further comprise girders, pipes, trusses and any other suitable supporting element, and an opening may be cut into any part of the framework. Typically the framework is made from metal, for example steel.

Typically, the at least one opening is cut with a Computer Numerical Control, CNC, machine.

The first support may be cut with a CNC machine. The mirror may be cut with a CNC machine. Cutting an opening may comprise cutting with a laser, cutting with a saw, drilling with a drill bit or any other suitable method. Alternatively the first support or the mirror may be cast, moulded or produced by any other suitable means.

It may be that the method of constructing a solar concentrator comprises further constructing a solar concentrator as described above.

In accordance with another aspect of the present invention there is provided a solar receiver comprising a tank, the tank comprising an aperture through which light is directed in use. The tank contains: a substantially transparent fluid; and a plurality of solid particles which are immersed within the fluid such that when light is directed through the aperture it is absorbed by an exposed layer of the solid particles. The solar receiver further comprises a first member, the first member being arranged to agitate the particles such that the solid particles in the exposed layer are changed. The tank further comprises at least one inlet for the substantially transparent fluid to enter the tank, and at least one outlet for the substantially transparent fluid to leave the tank.

In this way there is provided a solar receiver which can be used to collect thermal energy from sunlight. In use, it may be that sunlight enters the tank through the aperture, passing through the substantially transparent fluid to be absorbed by the exposed layer of solid particles. This heats the solid particles up. The solid particles are in thermal communication with the fluid, and as such the solid particles in turn heat the substantially transparent fluid. Meanwhile, the action of the first member causes the solid particles in the exposed layer to change, such that other solid particles may be heated. Once the fluid has reached a suitable temperature, it can exit the tank through the outlet while colder fluid can enter the tank through the inlet.

Substantially transparent here means transparent to the majority of light which enters the tank through the aperture in use. The substantially transparent fluid may, for example, absorb light in certain frequencies which are either narrow or represent only a small proportion of the energy in the light which enters the tank in use.

The first member may be located inside the tank or outside it. Heated fluid from the tank may be put to use. For example, the heated fluid may be used to generate steam which can be used in a steam generator to produce electricity. Alternatively, the heated fluid may be used to heat a building or for some other immediate use, or the heated fluid may be stored or used to heat another material such that the heat can be stored for later use.

It may be that the first member is arranged to agitate the solid particles such that the solid particles circulate. Typically all of the particles will circulate, such the all of the particles form part of the exposed layer at some point during use.

Typically, the first member is helical, and is arranged to rotate about the axis of the helix in use. Alternatively, the first member may comprise paddles which are arranged to stir the solid particles, or a rotating container such as a drum in which the solid particles are contained, or any other suitable shape or arrangement for agitating the solid particles as desired. The first member may be helicoid. The first member may resemble an auger. Typically, the first member is driven by a motor.

Where the first member is helical, the axis of the helix may substantially vertical with respect to gravity. In alternative embodiments, the axis of the helix is inclined, and may be arranged at any angle, including horizontal with respect to gravity.

It may be that the first member is located inside the tank, and the solar receiver further comprises a dividing wall, the dividing wall being located inside the tank and surrounded by solid particles, the dividing wall being arranged to enclosing a part of the first member. In this way, the first member may be arranged to agitate the solid particles such that they are driven inside the enclosing wall. For example, where the first member is helical, it may rotate so as to raise solid particles with respect to gravity within the dividing wall, while the solid particles which surround the dividing wall fall down to fill the void this creates. The dividing wall may be in the form of a hollow cylinder.

Typically, the solid particles are spherical.

It may be that each solid particle must satisfy the condition $B_i<1$, where $B_i=(\alpha \cdot r)/\lambda$, and wherein $\alpha$ is the coefficient of heat transfer from the fluid, r is the radius of a solid particle, and $\lambda$ is the thermal conductivity of the solid particle. $B_i$ is the Biot number, which is a dimensionless quantity based upon the ratio between the coefficient of the surface heat transfer and the inner resistance to thermal conductivity in the solid particles Typically the solid particles comprise a ceramic material. The solid particles may have a high absorption coefficient for solar radiation, for example in the range between 0.5 and 1. The solid particles may have a high temperature tolerance, for example being able to tolerate over 1200° C.

Typically, the fluid is a gas. The gas may be air, which is advantageous since air is both freely available and non-toxic. Since leakage of air into the environment is not dangerous, using air reduces the need to seal the solar receiver against leakage, although reducing air loss is still desirable since lost air may also represent lost heat.

Typically at least one outlet is higher than at least one inlet with respect to gravity. It may be that all of the outlets are higher than the inlets with respect to gravity. This can be helpful since the hottest fluid within the tank will tend to rise, and locating the outlets at a higher point in the tank may increase the average temperature of the fluid which leaves through the outlets.

In some embodiment, the tank further comprises a plurality of inlets for the substantially transparent fluid to enter the tank, the plurality of inlets being arranged in a radial pattern.

It may be that the solar receiver further comprises a primary inflow pipe, the primary inflow pipe being in fluid communication with all of the inlets of the tank.

In some embodiments the tank further comprises a plurality of outlets for the substantially transparent fluid to leave the tank, the plurality of outlets being arranged in a radial pattern.

It may bet that the solar receiver further comprises a primary outflow pipe, the primary outflow pipe being in fluid communication with all of the outlets of the tank.

A primary inflow pipe may be a toroid, for example a torus, which encloses the tank. Similarly, a primary outflow pipe may be a toroid, for example a torus, which encloses the tank.

Typically, the solar receiver further comprises a pump, the pump being connected to at least one of the inlets or outlets, and being arranged to pump the substantially transparent fluid through the tank. The pump may be a fan. Alternatively, fluid may move through the solar receiver due to convection currents, or because of fluid flow generated outside the solar receiver. The pump may be in the primary inflow pipe or the primary outflow pump. There may be a plurality of pumps.

Typically, the aperture is sealed by a substantially transparent cover. The substantially transparent cover may comprise a quartz window. The substantially transparent cover may be a lens. The substantially transparent cover may be a dome. The substantially transparent cover may be sealed by means of a gasket such as a ceramic gasket. The ceramic gasket may comprise ceramic wool arranged around the edges of the cover. The ceramic gasket may comprise two rings of ceramic wool, one on each side of the substantially transparent cover.

In accordance with a further aspect of the present invention there is provided a thermal energy storage system comprising: a container which comprises at least a first inlet, a second inlet and a third inlet for admitting fluid into the container and at least a first outlet and a second outlet for admitting fluid out of the container; and a solid thermal storage mass contained within the container. Each of the outlets and inlets is located at a height relative to gravity in use, such that the height of the first inlet is greater than the height of the second inlet, the height of the second inlet is greater than the height of the first outlet. The solid thermal storage mass comprises a plurality of openings such that the fluid can pass at least between the first inlet and the first outlet, between the second inlet and the first outlet, and between the third inlet and the second outlet by passing through the openings.

By directing high temperature fluid into the first inlet, an upper part of the thermal solid storage mass located near the first inlet is heated the most to create a high temperature layer. As the fluid flows towards the first outlet it continues to lose heat to the solid thermal storage mass, creating a low temperature layer which is located further down the solid thermal storage mass. Incoming fluid can then be directed to either the first inlet or the second inlet according to the temperature of the fluid. Directing fluid which is cooler than the high temperature layer but hotter than the low temperature layer to the second inlet allows that fluid to heat the low temperature layer without also cooling the high temperature layer.

The thermal energy storage system may comprise a plurality of valves which control fluid flow through the inlets and outlets.

Typically, the height of the second outlet is greater than the height of the third inlet. Hence low temperature fluid can be admitted to the thermal energy storage system by the third inlet, and then flow generally upwards to exit the system through the second outlet. The low temperature fluid is then first heated by the lower layers of the solid thermal storage mass, and subsequently heated by the upper layers. Where the upper layers are at a higher temperature than the lower layers, the fluid will therefore draw thermal energy from all the layers of the thermal storage mass it passes through.

Typically, the system further comprises an insulating layer which surrounds the container. The insulating layer may substantially surround the solid thermal storage mass, and may be provided with holes for the inlets and outlets of the container. It may be that the insulating layer comprises a particulate insulation material, such as perlite, expanded perlite or sand. The insulation material may be a powder. The insulating layer may surround a plurality of containers. The plurality of containers may be separated from one another by a dividing wall, which may itself be insulating and may be formed at least partly from the insulating materials described above. The dividing wall may comprise a refractory material, such as a refractory castable. Alternatively, the plurality of containers may comprise ducts to allow movement of fluid between a first container and a second container.

It may be that the container comprises a fourth inlet. Where a fourth inlet is provided, it may be that the height of the second inlet is greater than the height of the fourth inlet, and the height of the fourth inlet is greater than the height of the first outlet. In such cases, the fourth inlet may provide a further inlet for fluid which is cooler than the portion of the solid thermal storage mass located near the second inlet and so finely control the heating of different layers of the solid thermal storage mass. As many inlets as are required may be provided, so that the container may comprise a plurality of different inlets arranged at different heights.

Some inlets may be provided at similar heights so that fluid can be directed to the thermal solid thermal storage mass from several different directions at the same height. This may help to provide more even heating of the solid thermal storage mass.

It may be that the fluid is a gas. It may be that the fluid is air.

Typically, the solid thermal storage mass comprises porous material, which may be permeable to the fluid. The solid thermal storage mass may comprise a series of ducts through which the fluid can pass. The ducts may have been drilled, cast or otherwise formed in the solid thermal storage mass. The solid thermal storage mass comprises a plurality of bricks, such as checker bricks.

It may be that the system comprises a heat exchanger, the heat exchanger being connected to the third inlet and the second outlet.

Heat can be reclaimed by pumping a low temperature fluid into the container through the third inlet and out through the second outlet. The fluid is heated as it passes through the solid thermal storage mass, first by the low temperature layer and then by the high temperature layer. The heated fluid may then pass through the heat exchanger, for example to generate steam for power generation. Alternatively, the heated fluid can be used directly for heating.

Typically, the system comprises a plurality of solid thermal storage masses contained within the container, wherein a first solid thermal storage mass is separated from a second solid thermal storage mass by a first member. The system may further comprise a third solid thermal storage mass which is separated from the second solid thermal storage mass by a second member. The third solid thermal storage mass may also be separated from the first solid thermal storage mass by the first or second member. As many solid thermal storage masses as are required may be provided. The members may be formed from a refractory material, such as a refractory castable.

It may be that the first solid thermal storage mass has a centre of mass which is higher with respect to gravity than the centre of mass of the second solid thermal storage mass. The first solid thermal storage mass may be located over the second solid thermal storage mass. Two or more of the plurality of solid thermal storage masses may be arranged in a substantially vertical column, with the first solid thermal storage mass at the top.

The first inlet may be higher than the uppermost part of any one of the one or more solid thermal storage masses. The second outlet may be higher than the uppermost part of any one of the one or more solid thermal storage masses. The third inlet may be lower than the lowermost part of any one of the one or more solid thermal storage masses. The first outlet may be lower than the lowermost part of any one of the one or more solid thermal storage masses. Where a plurality of solid thermal storage masses is used, the second inlet may lie between the first solid thermal storage mass and the second solid thermal storage mass. A fourth inlet may lie between the second solid thermal storage mass and the third stolid thermal storage mass.

In accordance with a further aspect of the present invention, there is provided a method of operating a thermal energy storage system. The method comprises: providing a thermal energy storage system according to any preceding claim; directing a fluid through the first inlet so that it pass through the solid thermal storage mass and out of the first outlet when the temperature of the fluid is greater than the temperature of an upper part of the solid thermal storage mass; and directing the fluid through the second inlet so that it pass through the solid thermal storage mass and out of the first outlet when the temperature of the fluid is less than the temperature of an upper part of the solid thermal storage mass.

A further aspect of the invention also provides a solar collector comprising a solar receiver as described above and at least one mirror, the mirror being arranged to direct solar radiation into the solar receiver through the aperture. The solar collector may comprise a plurality of mirrors, each of which is arranged to direct solar radiation into the solar receiver through the aperture. The solar collector may comprise a solar concentrator as described above, or a solar concentrator constructed according to a method as described above, which is arranged to direct solar radiation into the solar receiver.

A further aspect of the invention provides a collar collector comprising a solar concentrator as described above, or a solar concentrator constructed according to a method as described above, the solar collector further comprising a solar receiver which is arranged to receive solar radiation from the solar concentrator such that the solar radiation heats up a fluid in the solar receiver.

A further aspect of the invention provides a concentrating solar power system comprising a solar collector, the solar collector comprising at least one mirror and a solar receiver, the mirror being arranged to direct solar radiation into the solar receiver such that the solar radiation heats up a fluid in the solar receiver. The concentrating solar power system further comprises a thermal energy storage system as described above, and the thermal energy storage system is connected to the solar receiver such that heat from the fluid in the solar receiver can be stored in the thermal energy storage system.

A further aspect of the invention provides a concentrating solar power system comprising a solar collector as described above, wherein the concentrating solar power system further comprises a thermal energy storage system, and wherein the thermal energy storage system is connected to the solar receiver such that heat from the fluid in the solar receiver can be stored in the thermal energy storage system. The thermal energy storage system may be a thermal energy storage system as described above.

In either of the above two aspects, the thermal energy storage system may be connected to the solar receiver such that fluid can pass from one to the other. Alternatively, the thermal energy storage system may be connected to the solar receiver by a heat exchanger.

Any of the concentrating solar power systems provided by the invention may comprise a thermal energy storage system which is configured operated as described above.

BRIEF DESCRIPTION OF THE DRAWINGS

Embodiments of the invention will now be described by way of example only, with reference to the accompanying figures, in which:

FIG. 41 shows a fourth CSP system according to an embodiment of the invention.

DETAILED DESCRIPTION OF EMBODIMENTS OF THE INVENTION

Figure 3:
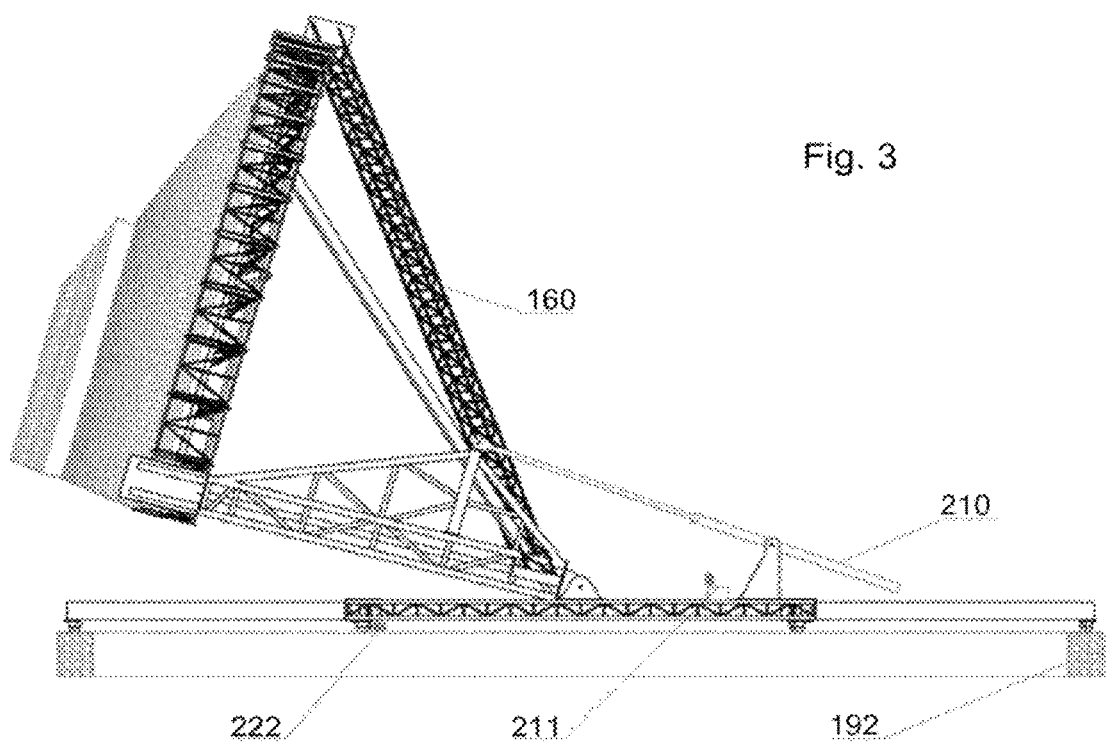
Figure 4:
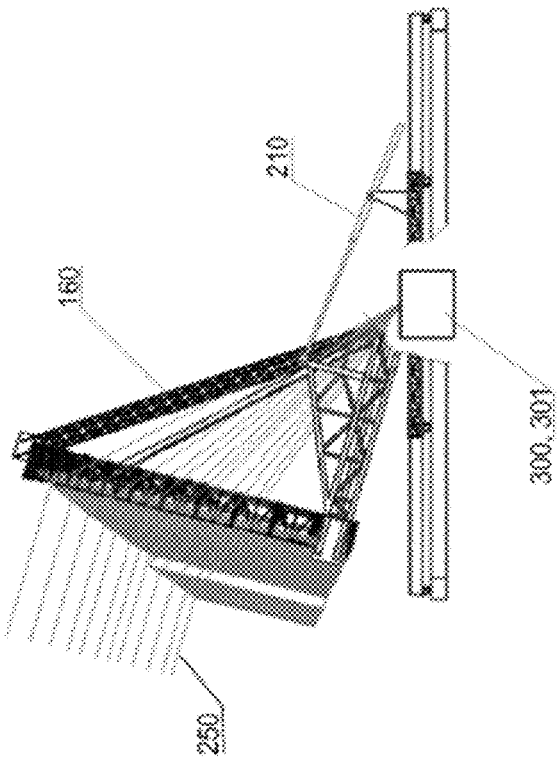
Figure 5:
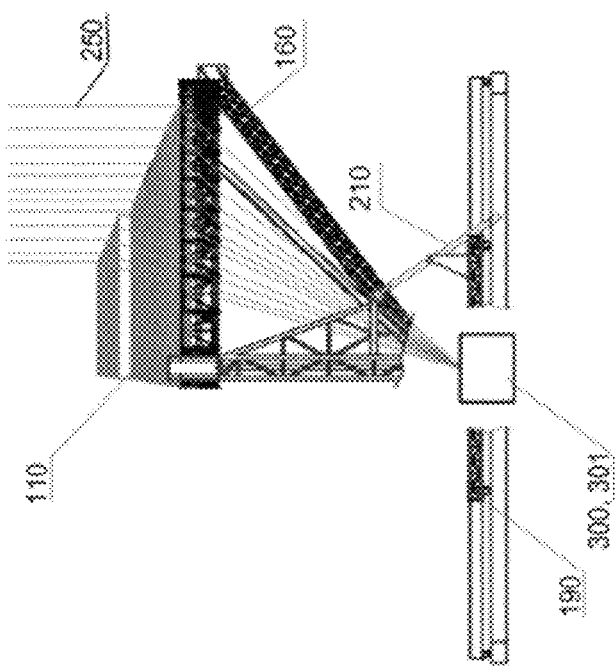
Figure 6:
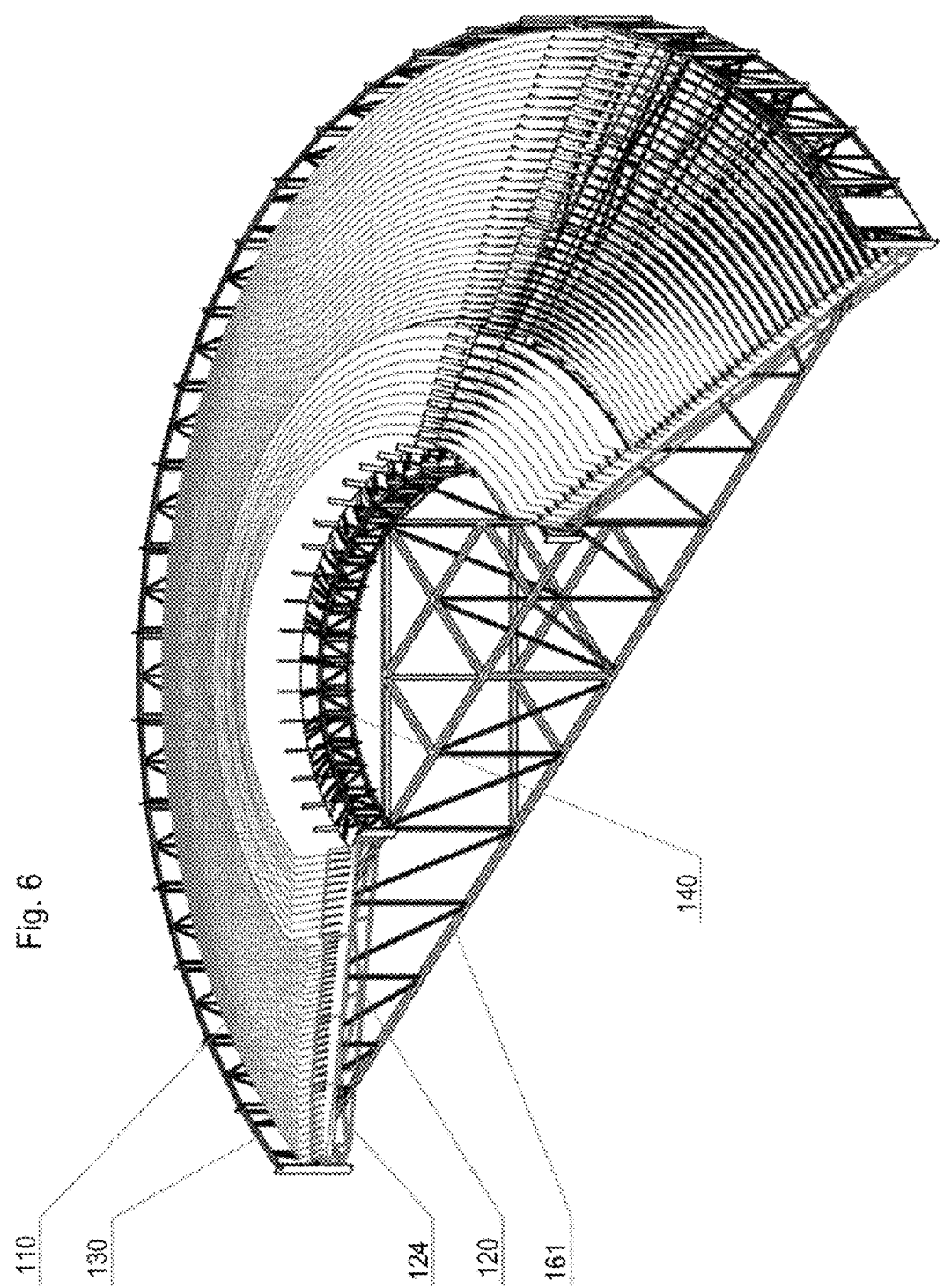
FIG. 6 shows an upper part of the first solar concentrator.

FIGS. 1 to 5 show a first solar concentrator 100 according to an embodiment of the invention. FIG. 6 shows an upper part of the first solar concentrator 100. The concentrator 100 comprises a plurality mirrors 110 which are supported by supporting members 120 which are connected to an outer semi-circular gantry 130 and an inner semi-circular gantry 140. The gantries 130, 140 are connected to pillars 150 and trusses 160, 161. As can be seen in FIG. 5, a T-bar truss 161 connects the outer semi-circular gantry 130 to the inner semi-circular gantry 140. The supporting members 120, the gantries 130, 140, the pillars 150 and the trusses 160, 161 form a framework 170 which supports the mirrors 110. The framework 170 is joined by hinges 180 to a base 190.

Figure 1:
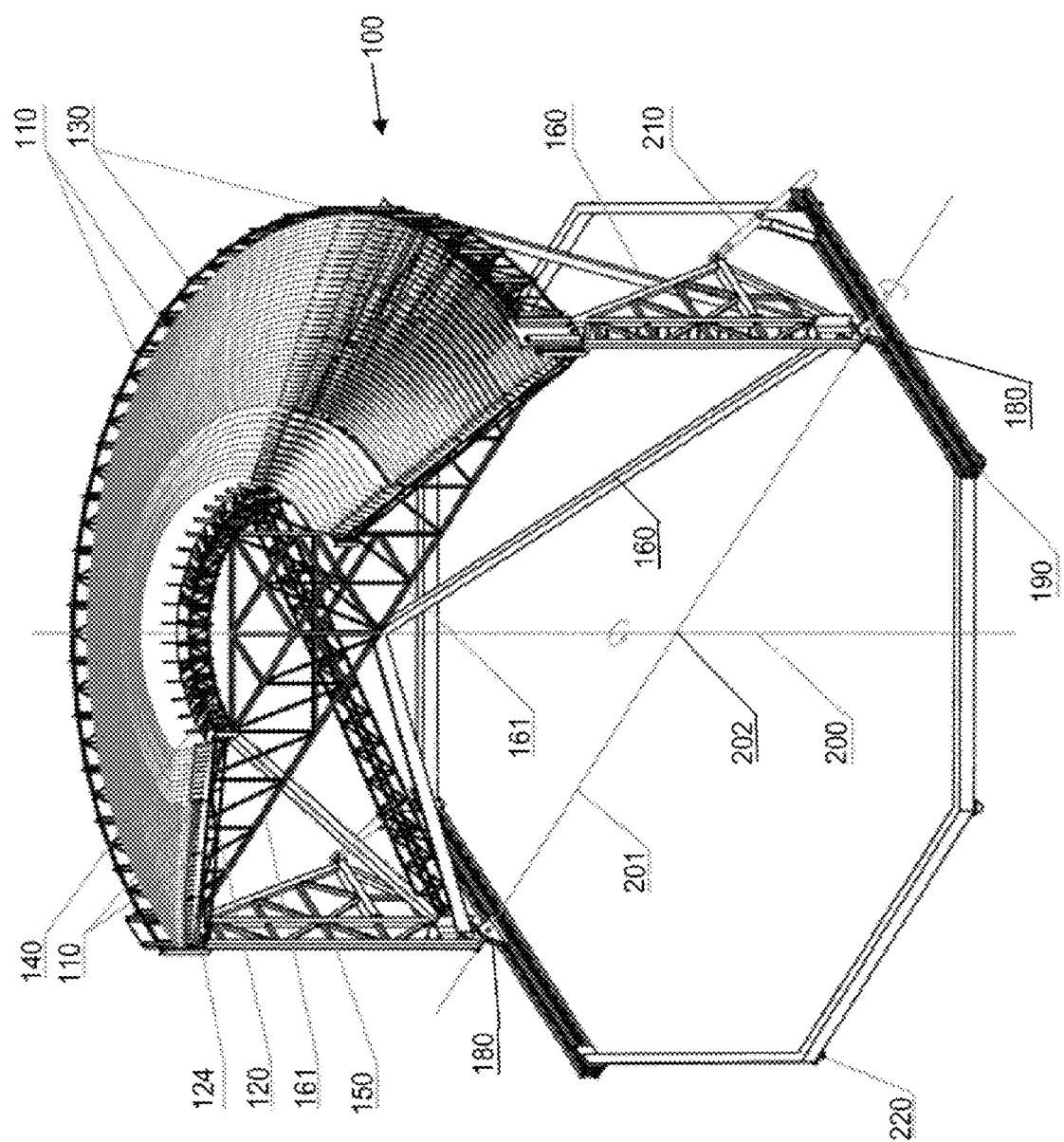
FIGS. 1, 2, 3, 4 and 5 show a first solar concentrator according to an embodiment of the invention.
Figure 2:
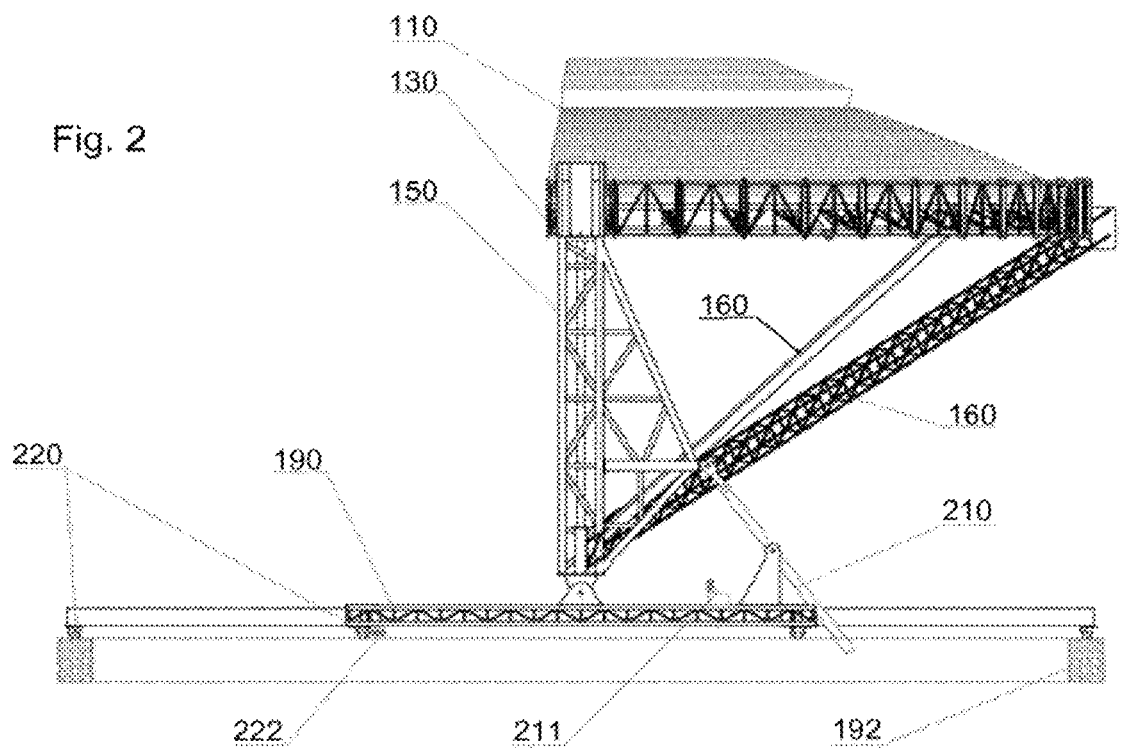

The mirrors 110 are arranged in a plurality of concentric semi-circular arcs so that the every part of a given arc is substantially equidistant from a first axis 200. Hydraulic cylinders 210 also connect the framework 170 to the base 190 so that the framework 170 and the mirrors 110 can be rotated relative to the base 190 around a second axis 201 by operating the hydraulic cylinders 210. FIGS. 2 and 3 show the framework 170 moving relative to the base 190 as the hydraulic cylinders 210 are operated by an aggregate 211.

The mirrors 110 are arranged so that light which is traveling substantially parallel to the first axis and strikes one of the mirrors 110 is reflected towards a common focus 202, or focal point, which lies substantially at the intersection of the first axis and the second axis.

The base 190 comprises a plurality of wheels 220 so as to form a carrousel. The wheels 220 rest on a track 192. As such the base 190 can rotate around a third axis (not shown in the illustrations). The third axis passes through the common focus 202. The third axis is substantially normal to the plane on which the base rests.

FIGS. 4 and 5 illustrate the passage of light beams 250 traveling parallel to the first axis 200 through the first solar concentrator 100. The light beams 250 are focussed towards the common focus 202, where a solar receiver can be placed in order to receive the light concentrated by the first solar concentrator 100. Since the common focus 202 is located on the second axis 201 and the third axis, it does not move as the framework 170 rotates about the second axis 201, or as the base 190 rotates about the third axis. Therefore the common focus 202 does not move during operation of the first solar concentrator 100 and a solar receiver placed at the common focus 202 does not is always at the common focus.

By rotating the framework 170 and the base 190, the mirrors 110 can be rotated so as to track the movement of the sun across the sky as shown in FIGS. 4 and 5, and so maximise the amount of energy harvested by the mirrors 110 and directed towards a solar receiver.

The mirrors 110 are arrange on one side of a plane which contains the first axis 200. As such it is possible to rotate the framework 170 about the second axis 201 such that the first axis is horizontal with respect to a plane on which the base 190 is standing. As such, the first solar concentrator 100 can track the movement of the sun even when the sun is near the horizon. This allows a solar receiver placed at the common focus 202 to function efficiently even at sunrise or sunset.

Figure 7:
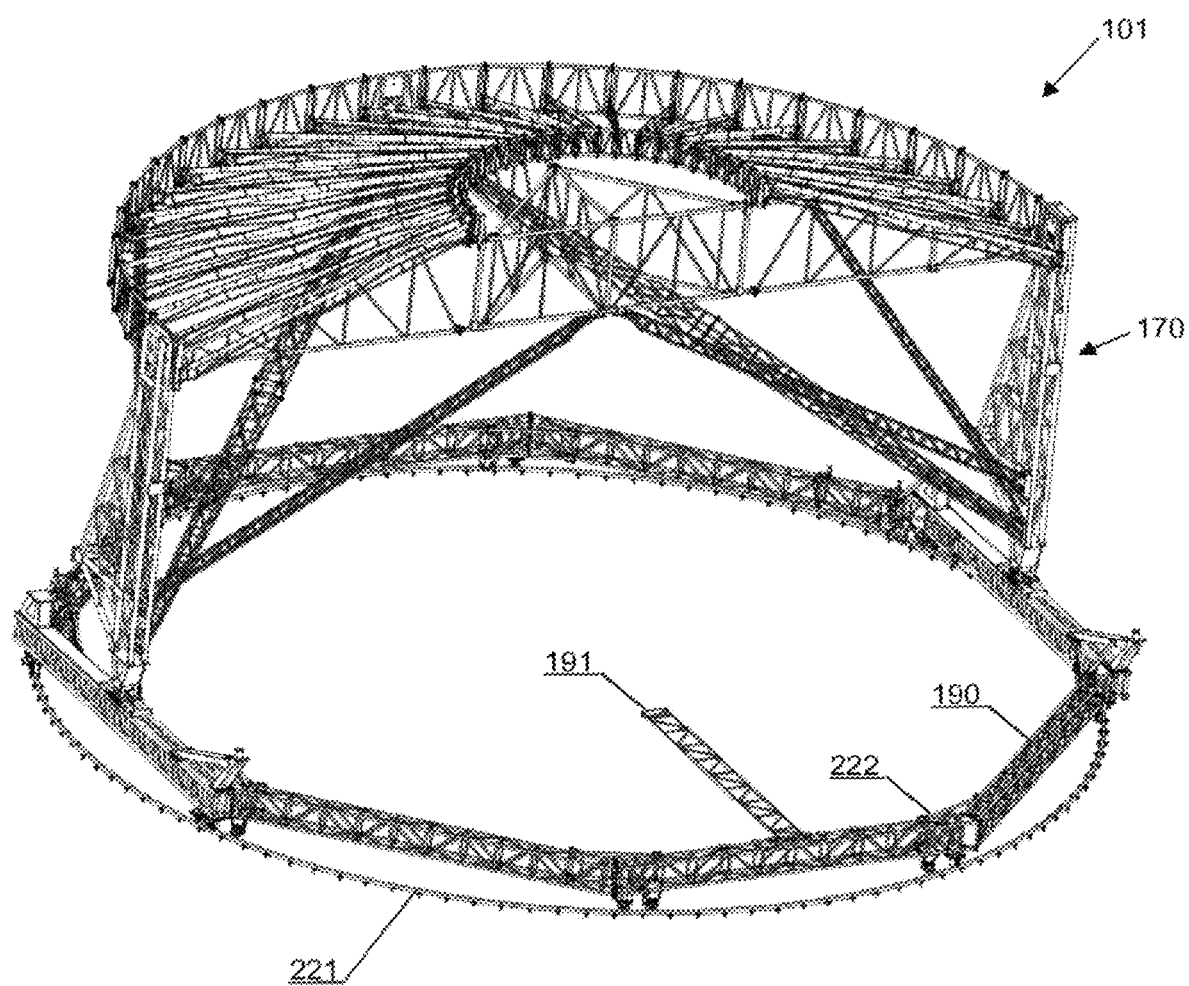
FIG. 7 shows a second solar concentrator according to an embodiment of the invention.

FIG. 7 shows a second solar concentrator 101 according to an embodiment of the invention. Similar parts are provided with similar numbers in the second solar concentrator, which is shown without the mirrors 110. The base 190 of the second solar concentrator 101 further comprises a cable carrier 191 which supports cables running between the base 190 and a solar receiver (not shown in FIG. 7). The second solar concentrator 101 also further comprises a track 221 on which the wheels 220 rest. The track 221 is circular, and guides the movement of the wheels 220 when the base 190 rotates around a second axis 220.

Also shown in FIG. 7 are electric motors 222 which drive the wheels 220 when the base 190 rotates on the track 221.

In order to achieve a high concentration of solar energy in the common focus 202, it is desirable to control the position of the mirrors 110 with respect to the first axis 200 and second axis 201 as precisely as possible during the manufacture and construction of the first or second solar concentrator 100, 101.

The pillars 150, trusses 160, 161 and gantries 130, 140 of a first or second solar concentrator 100, 101 can be manufactured by welding together supporting elements such as girders. The T-bar truss 161, for example, is made of thick-wall pipes with square and rectangle cross-sections which are welded together.

Figure 8:
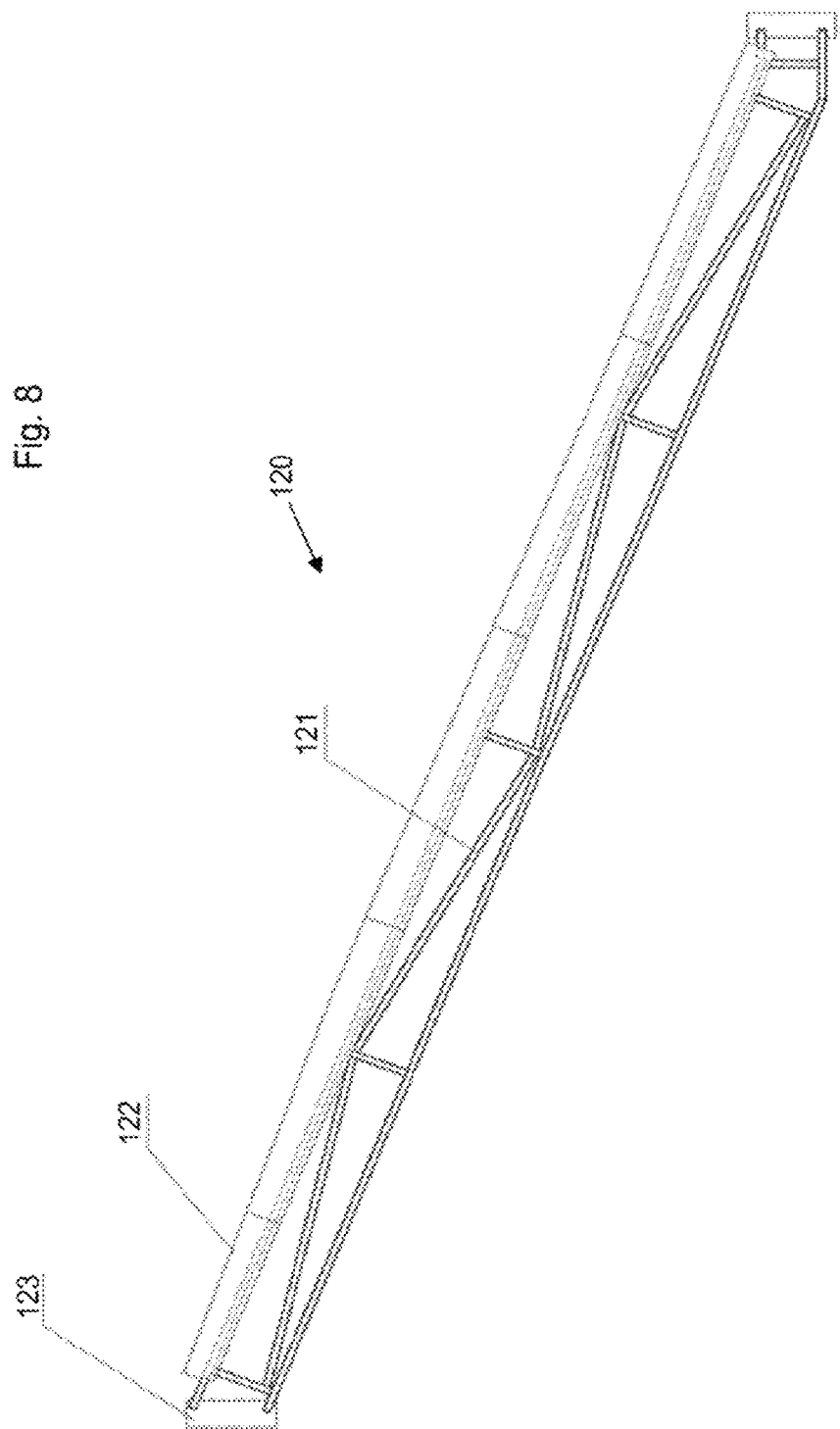
FIG. 8 shows a supporting member from the first or second solar concentrator.

FIG. 8 shows a supporting member 120 for use in a first or second solar concentrator 100, 101. The supporting member 120 comprises a plurality of rectangular pipes 121 which are welded together. A plurality of sheet panels 122 are then welded onto the rectangular pipes 121 and a plate flange 123 is welded to the rectangular pipes 121 at each end of the supporting member 120. In use, the plate flanges 123 are used to mount the supporting member 120 to the gantries 130, 140.

Figure 9:
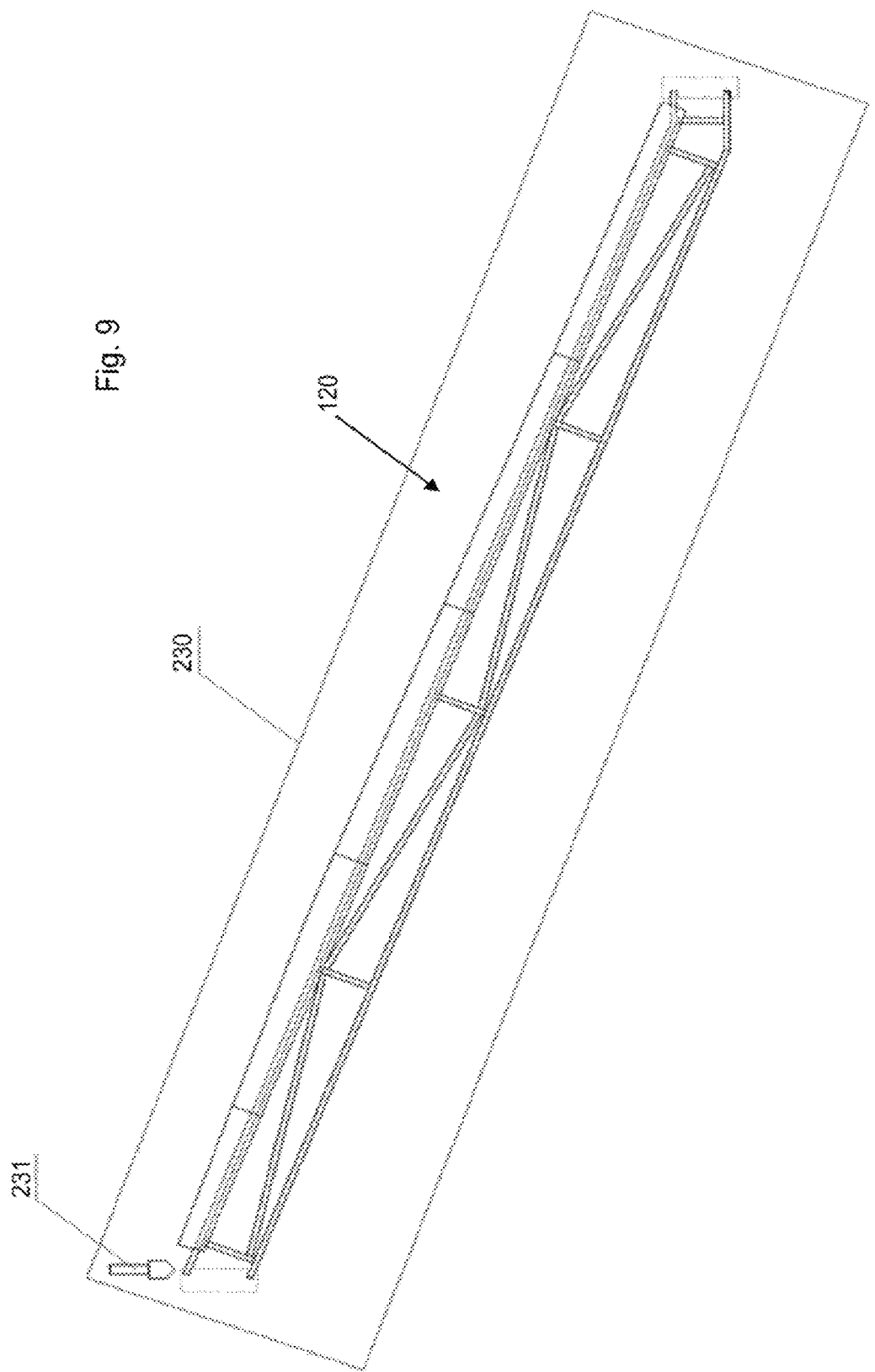
FIGS. 9, 10 and 11 show a method of assembling the supporting member.
Figure 10:
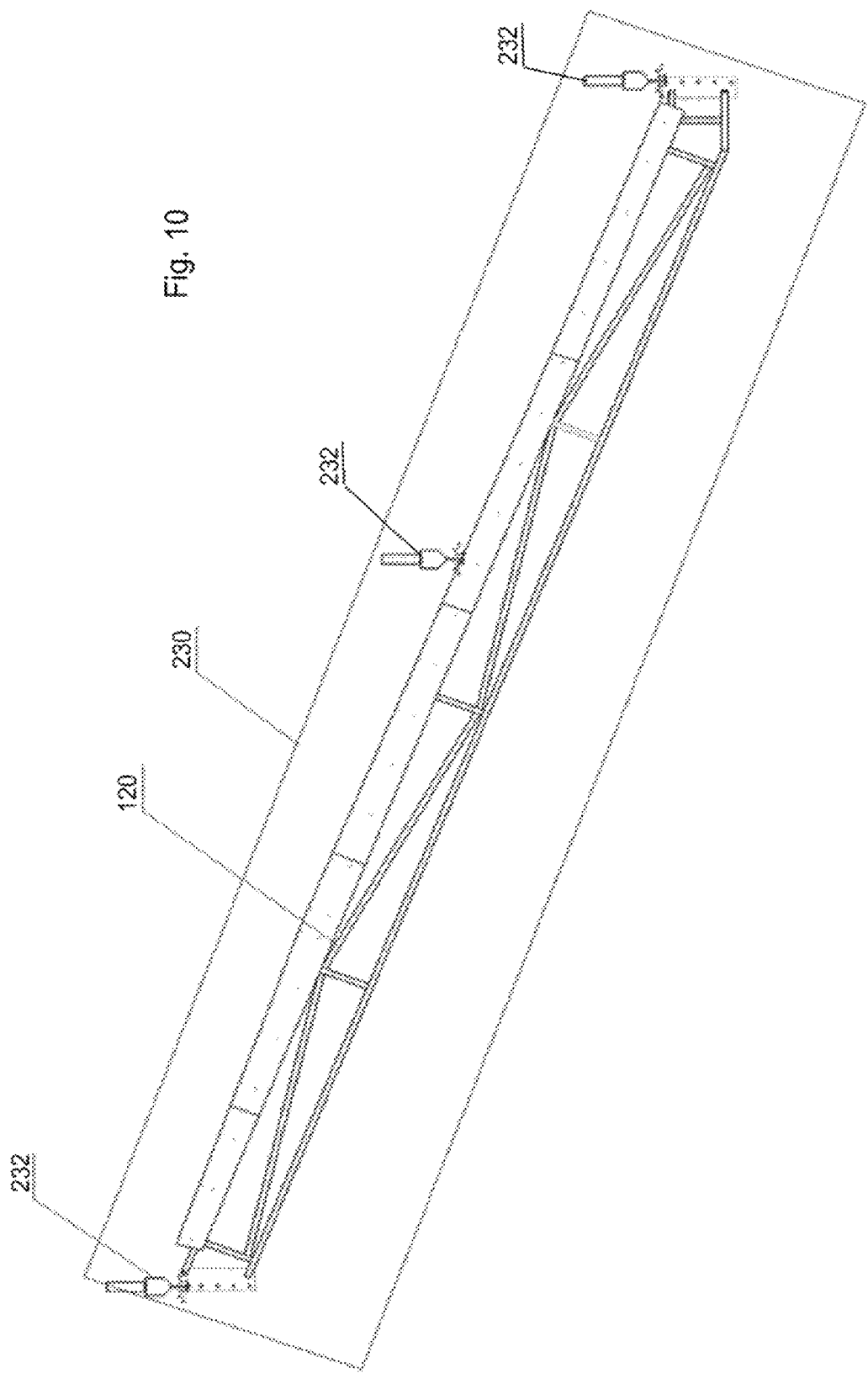

After it has been welded together, the supporting member 120 is placed on a Computer Numerical Control (CNC) laser table 230 as is shown in FIG. 9. The CNC table comprises a measuring head 231 which is used to take measurements of the supporting member 120. Next, openings are cut in the supporting member 120 using the laser cutting heads 232 of the CNC table 230. The position and shape of the openings which are cut in the supporting member 120 can be precisely controlled in light of the measurements taken by the measuring head 231.

Figure 11:
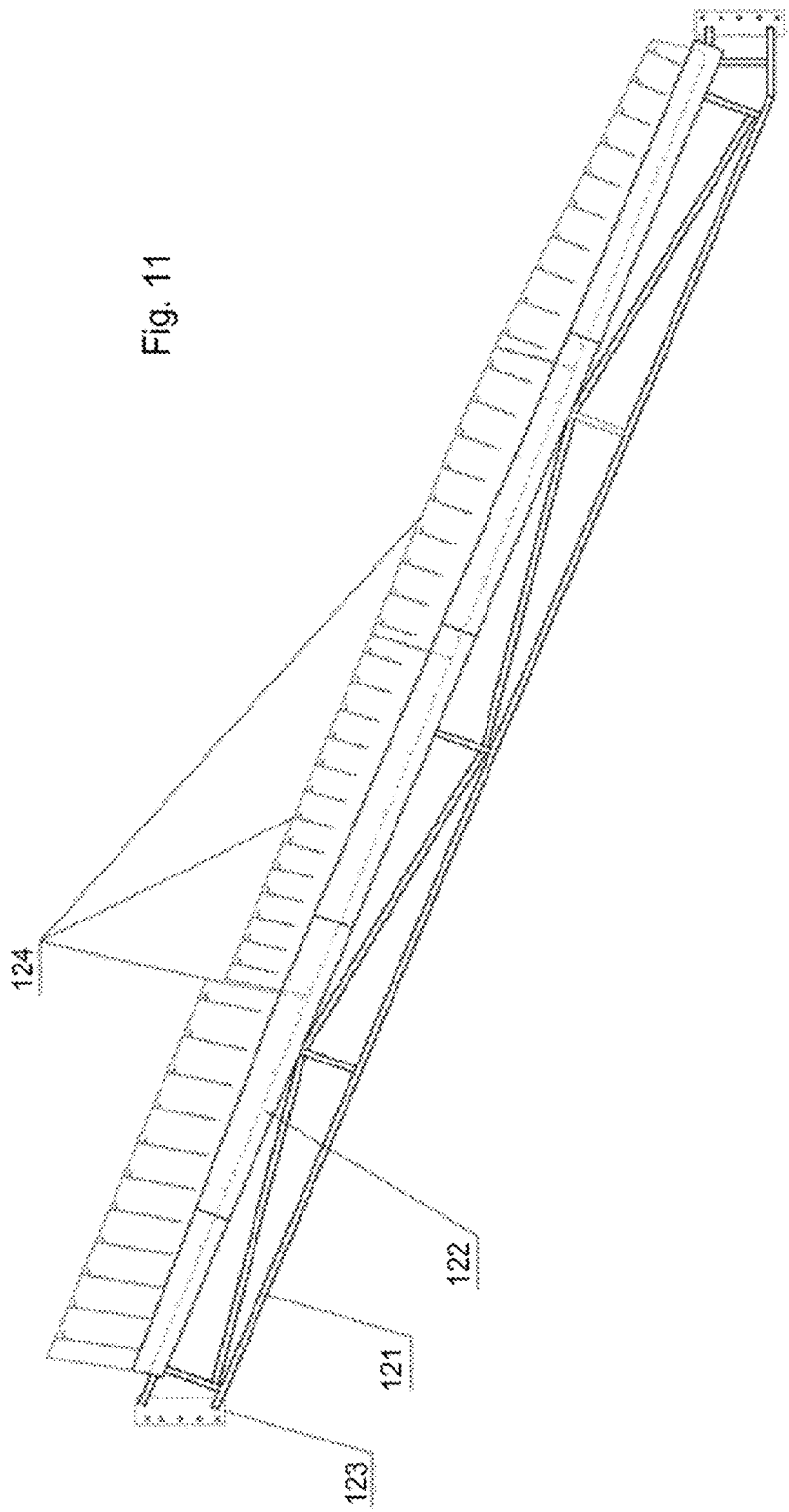

The openings are cut into the plate flanges 123 and the sheet panels 122. The openings in the plate flanges 123 are used to fasten the supporting member to the gantries 130, 140, and the openings in the sheet panels 122 receive racks 124 as shown in FIG. 11. The racks 124 are fixed to the sheet panels 122 by fastening screws through holes cut in the racks using the CNC machine and through the openings in the sheet panels 122.

Figure 12:
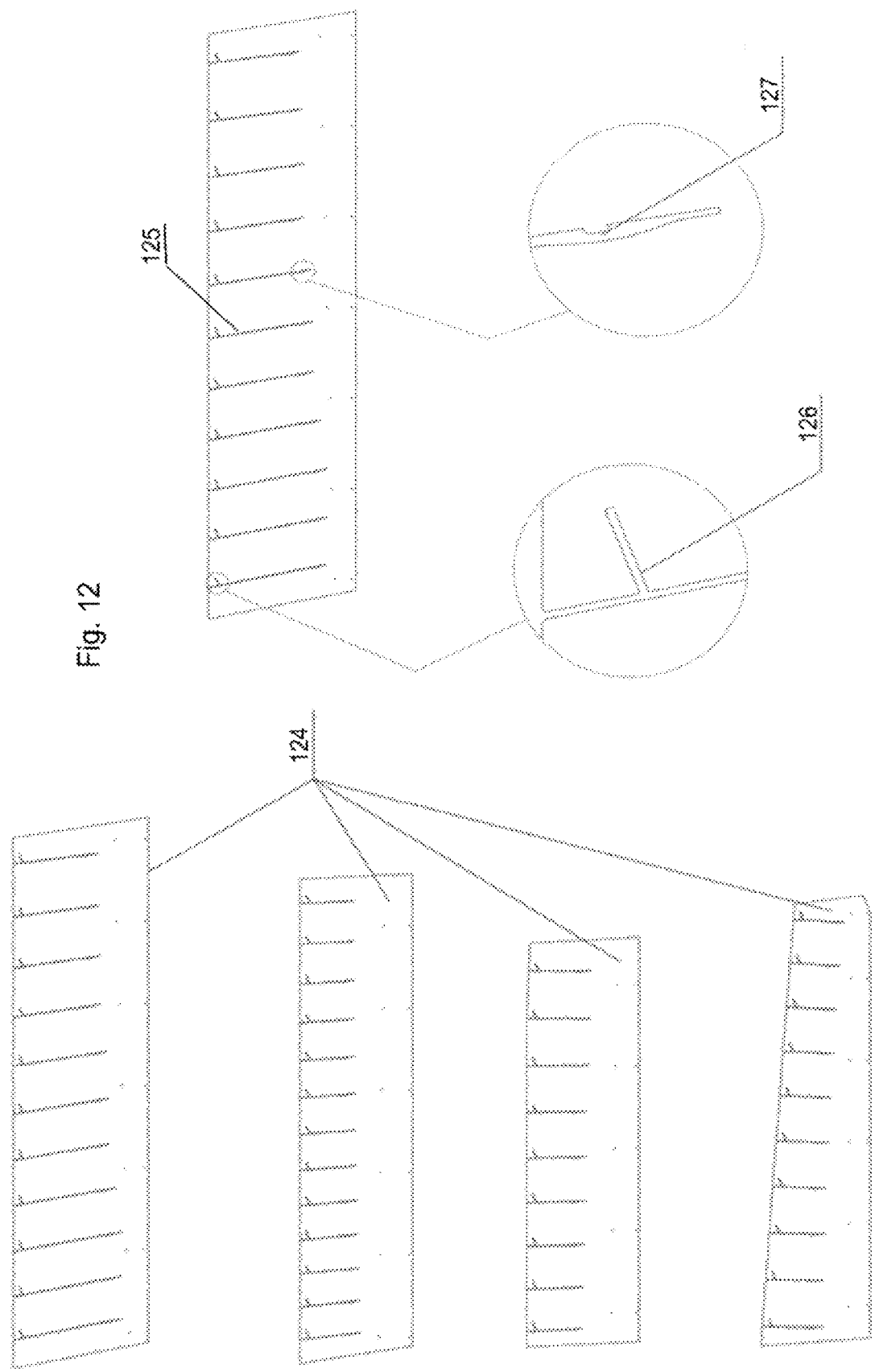
FIG. 12 shows various racks which can be attached to the supporting member.

FIG. 12 shows various racks 124, which are cut in different shapes depending on which part of the supporting member 120 they are to be attached to. Each rack comprises a plurality of first slots 125, the slots being shaped to provide first notches 126 and second notches 127.

The mirrors 110 are attached to the racks 124 once construction of the framework 170 is completed.

The accurate cutting of openings in the supporting member 120 enables the precise placement of the racks 124 which in turn define the appropriate angle of mirrors 110 and provide a precise optical system. Any irregularities introduced during the welding can be measured with the measuring head 231 of the CNC table 230 and then compensated for by adjusting the position of the openings. In this way it is possible to provide a system with tolerances which are equal to or less than ±1 mm. In addition, the size and shape of the racks 124 can be changed if necessary to further compensate for irregularities. For example, the height or width of one or more racks 124 can be changed, and the position of a first slot 125 can be changed.

The mirrors 110 are made from polished aluminium plate with a thickness of 0.5 mm to 1 mm, and are cut on the CNC table 230. The mirrors 110 are provided with arcs 111 and ribs 112 which support the mirrors and prevent the aluminium from deforming under its own weight. The arcs and ribs 111, 112 are also cut on the CNC table 230 to provide accurate sizes and shapes.

Figure 13:
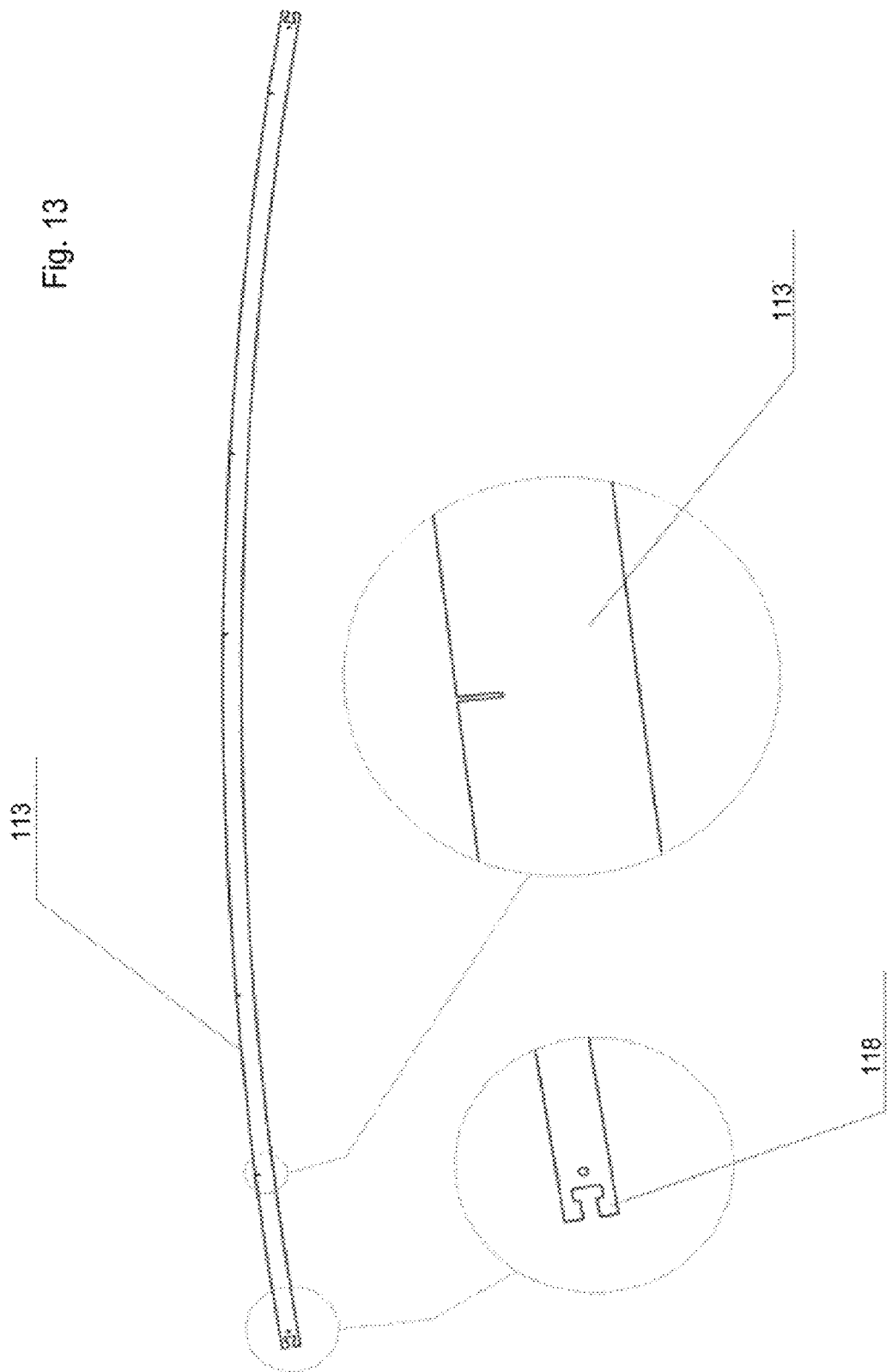
FIG. 13 shows an arc from the first or second solar concentrator.

FIG. 13 shows an arc 111. The arc is curved so that it follows the curve of the mirror 110 which it supports and in use the arc is placed up against the back, or non-reflective side, of the mirror 110. The arc comprises a plurality of third notches 113.

Figure 14:
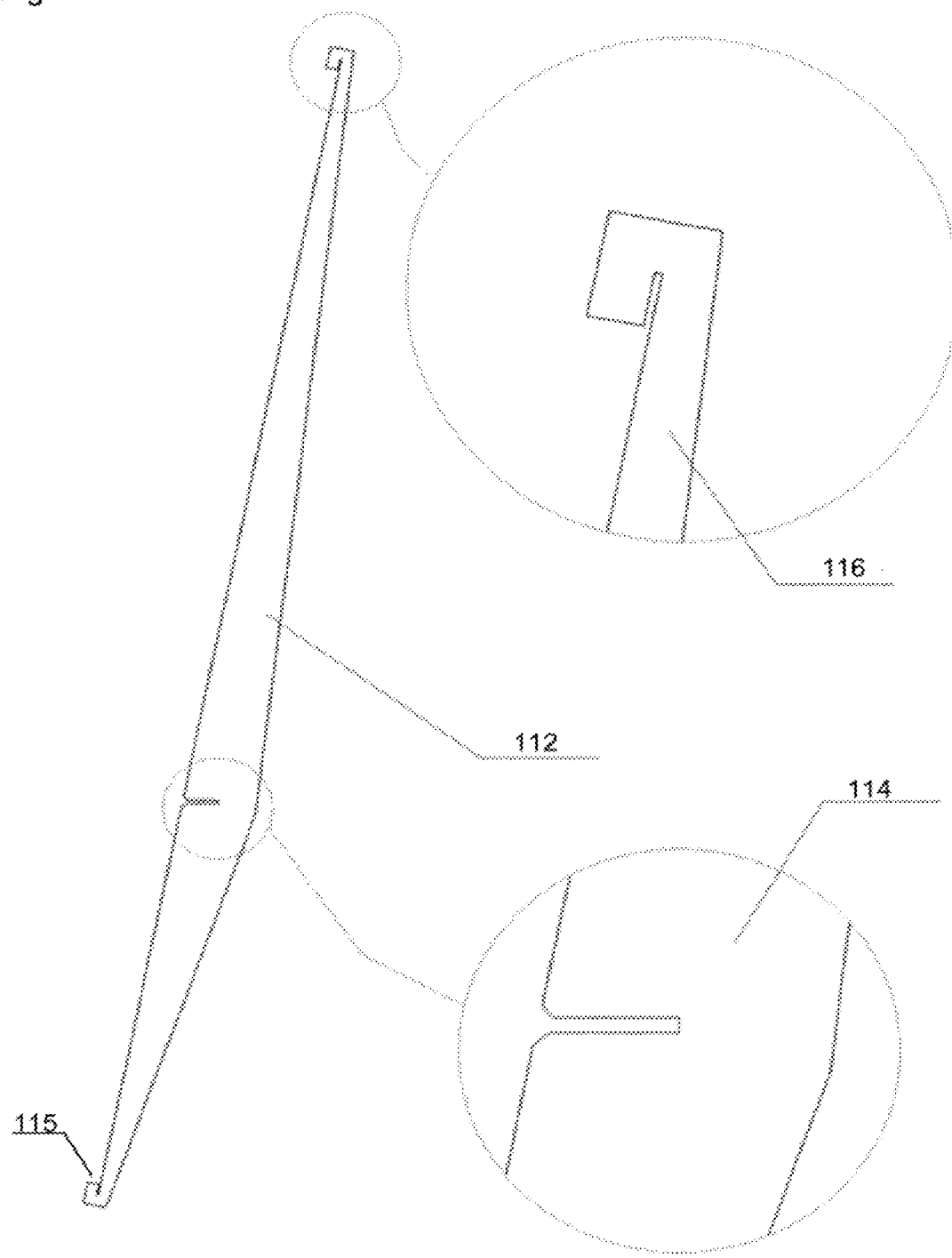
FIG. 14 shows a rib from the first or second solar concentrator.
Figure 15:
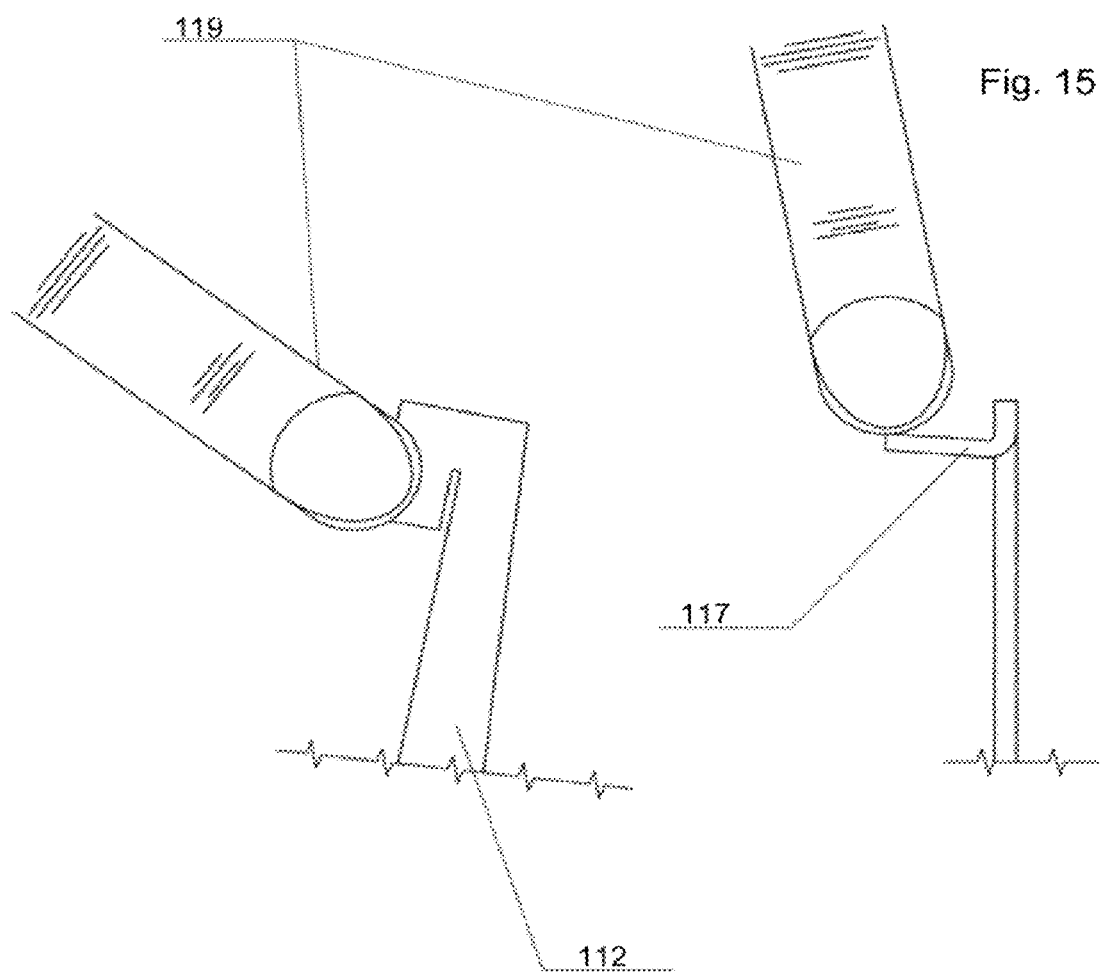
FIG. 15 shows a method of installing the rib.

FIG. 14 shows a rib 112. Each rib comprises a fourth notch 114, a fifth notch 115 and a sixth notch 116. To fit a rib on a mirror, the fifth and sixth notches 115, 116 are first opened, typically by using fingers 119 to bend each rib as shown in FIG. 15. Each rib 112 is plastically deformed by applying pressure to an overhang 117, hence opening up the fifth notch 116 and the sixth notch 116. The mirror 110 can then be placed against the rib so that the rib is in contact with the back of the mirror. The fourth notch 114 fits into a third notch on the arc 111.

The fifth and sixth notches 115, 116 are then closed by reversing the bending process of FIG. 15. Each rib 112 is plastically deformed by applying pressure in a reversed direction to the overhang 117, hence closing up the fifth notch 115 and the sixth notch 116. This is done such that the mirror 110 extends into both the fifth notch 115 and the sixth notch 166.

When completed, the arc 111 is held in place between the mirror 110 and a plurality of ribs 112, the mirror being wedged within the fifth and sixth notches 115, 116 of the plurality of ribs 112.

Each arc 111 comprises two fastening points 118, one at each end of the arc. When the mirrors 110 are installed on the framework 170, the fastening points 118 of adjoining arcs 111 are fastened together to provide additional integrity to the structure.

Figure 16:
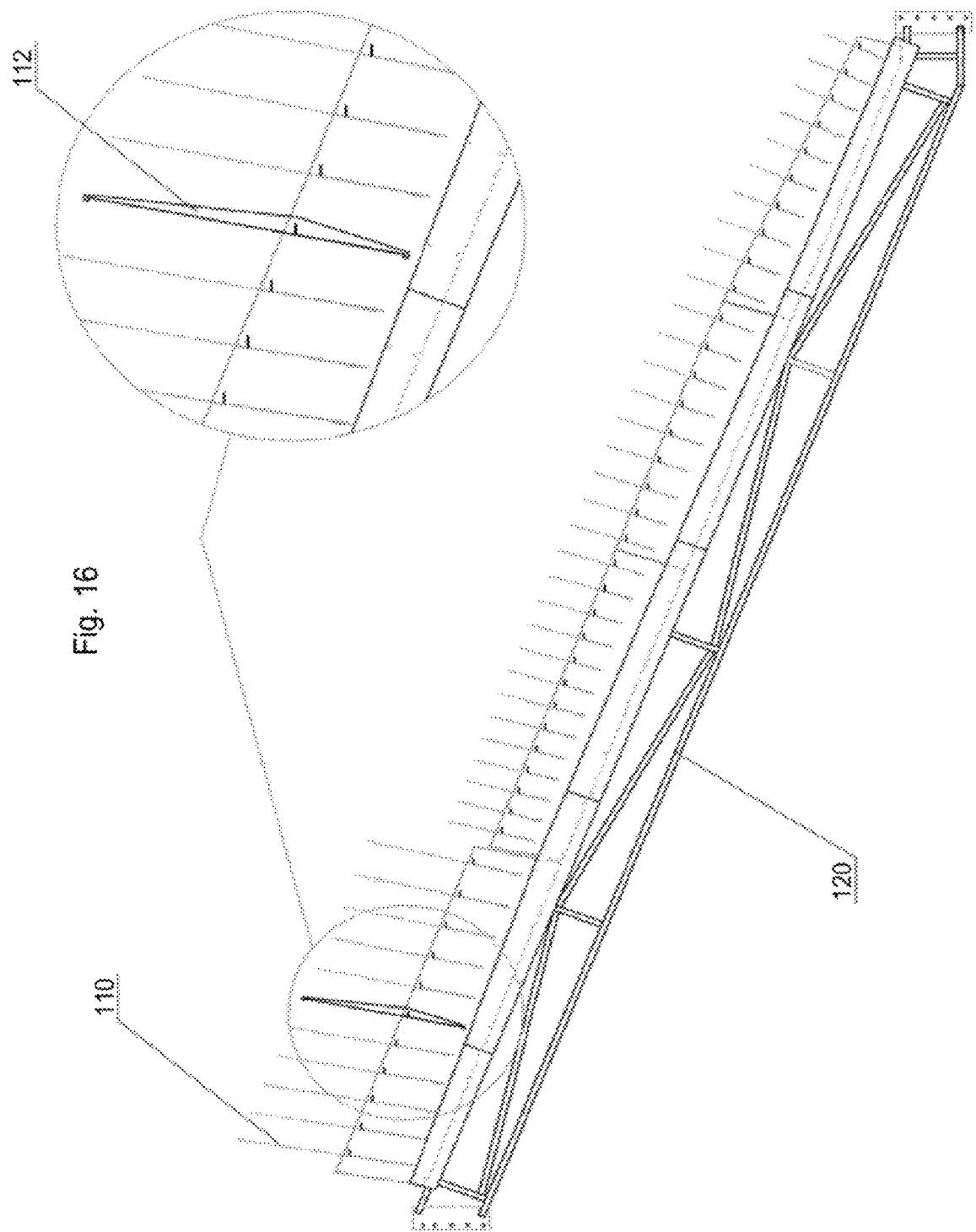
FIG. 16 shows a further supporting member from the first or second solar concentrator.

FIG. 16 shows a support member 120 which has been fitted with mirrors 110. One rib 112 is shown in situ for reference. The mirrors 110 sit in the slots 125 of the racks 124, and the arcs 111 pass through the first notches 126 in the racks 124.

In a particular embodiment of a solar concentrator according to the present invention, the effective area of the mirrors is 200 m². The diameter of the common focus 202, or the narrowest beam of concentrated sunlight rays, is 0.280 m. The concentration ratio is 3200. The temperature in the common focus 202 is 2600° C.

Figure 17:
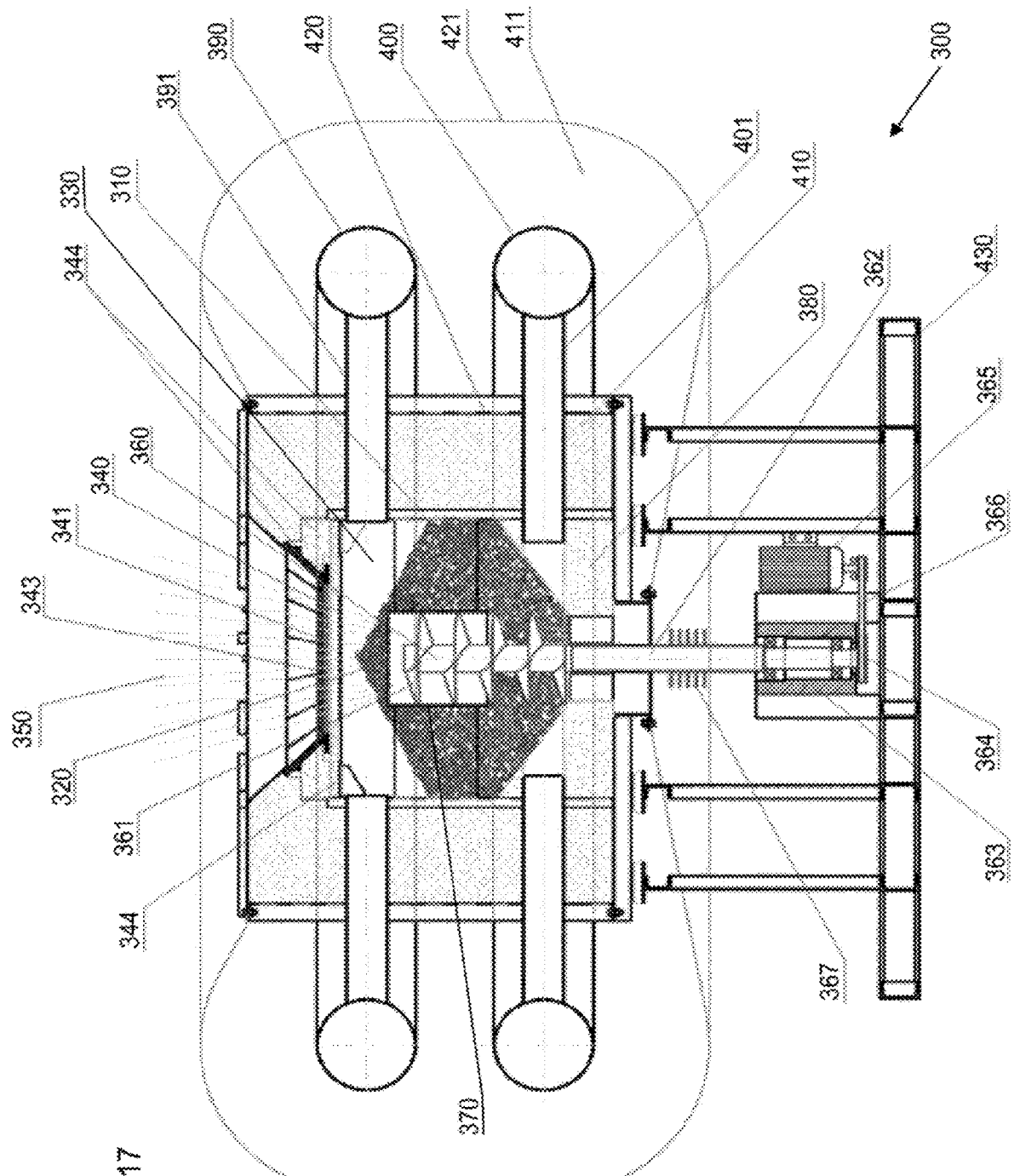
FIGS. 17, 18 and 19 show a first solar receiver according to an embodiment of the invention.

FIG. 17 shows a first solar receiver 300. The first solar receiver comprises a tank 310 which contains solid particles 320 which are immersed in a working fluid 330. The tank 310 comprises an opening 340 through which light 350 can enter the tank 310.

The working fluid 330 is substantially transparent, such that the light 350 will pass through the working fluid 330 and hit the solid particles 320. Hence, the solid particles 320 are heated by absorbing the light 350.

Figure 18:
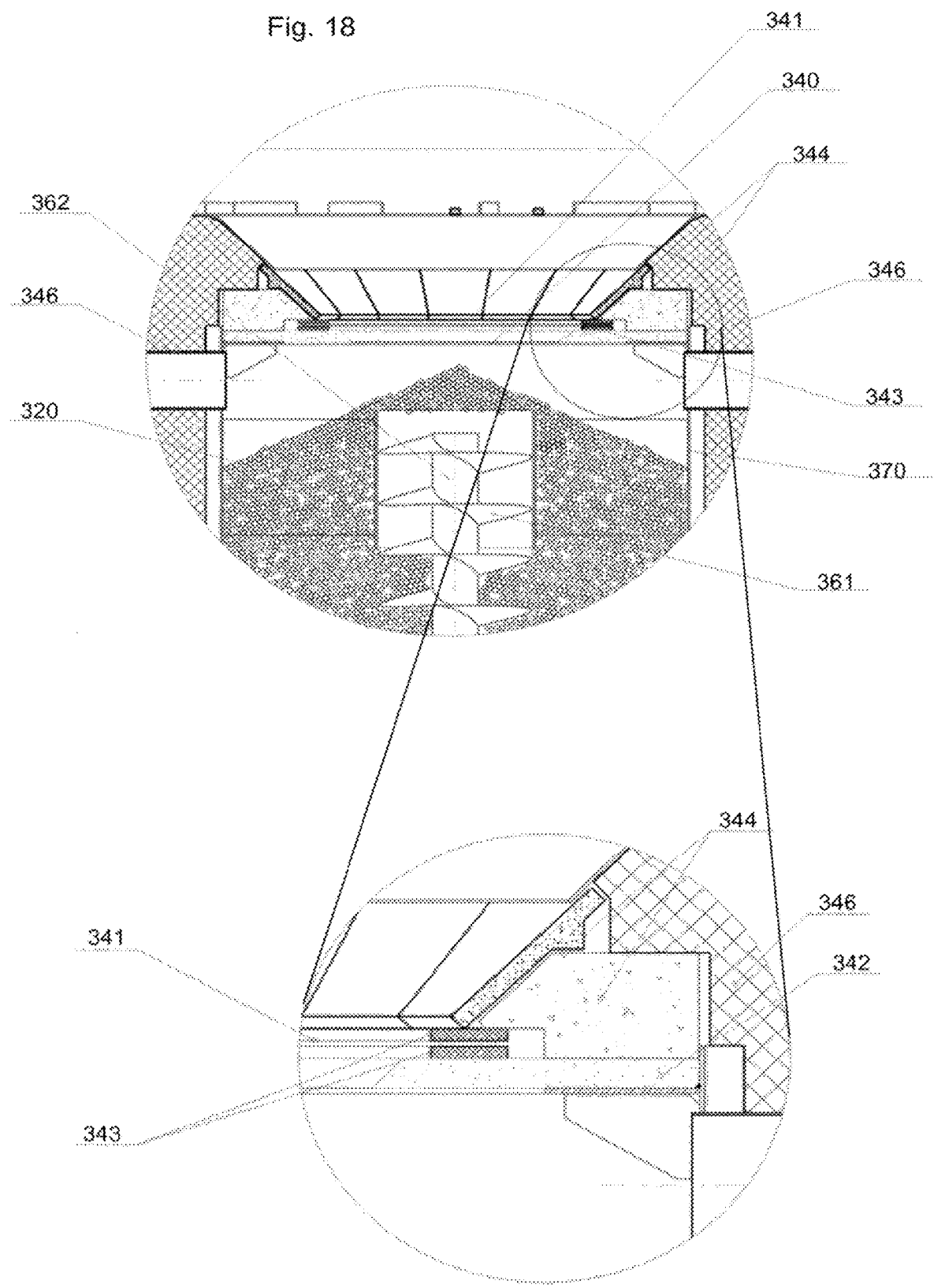

The opening 340 is shown in greater detail in FIG. 18. The opening is sealed with a substantially transparent pure quartz sheet 341, through which the light passes in use. A set of ceramic support members 342 is fastened around the edge of the opening 340. Two ring shaped ceramic gasket 343 are placed on top of the ceramic support members, either side of the quartz sheet 341. A set of ceramic retaining elements 344 serve to hold the gaskets 343 and the quartz sheet 341 in place against the walls 346 of the solar receiver 300, pressurizing the gaskets 343 with its mass so that a seal is formed and the working fluid 330 cannot escape through the opening 340. This prevents convective heat losses, and prevents air surrounding the first solar receiver 300 from mixing with the working fluid 330.

The quartz sheet can expand and contract in response to changes in temperature. This causes some movement of the ceramic retaining elements 344, but since these elements are held in place by their mass rather than a fastening means, there is no risk of the components breaking if they expand at different rates.

The first solar receiver 300 further comprises a vertical screw transporter 360. The vertical screw transporter 360 comprises a helical blade 361 which is arranged around a cylindrical shaft 362. The cylindrical shaft 362 extends outside the tank 310 and enters a housing 363. The housing 363 comprises bearings which hold the shaft at a constant height with respect to the first solar receiver 300 while still allowing the shaft 362 to rotate about its longitudinal axis. A pulley 364 at the end of the shaft 362 is connected to an electric motor 365 by a belt 366 sot that the electric motor 365 can drive rotation of the shaft 362, and hence drive rotation of the helical blade 361.

The shaft 362 is hollow, in order to reduce heat loss from the tank 310 through conduction along the shaft 362. In addition, the shaft comprises a plurality of discs 367 which extend outwards form the shaft 362 once it has left the tank 310. The discs 367 act as cooling fins, radiating heat away from the shaft 362 in order to reduce the temperature of that part of the shaft 362 which is near the housing 363.

In use, the first solar receiver 300 is arranged in an orientation with the opening 340 above the vertical screw transporter 360 so that the longitudinal axis of the shaft 362 is substantially vertical with respect to gravity.

An upper part of the vertical screw transport 360 is contained within a hollow cylinder 370, which has an internal radius substantially the same as the radius of the helical blade 361. As such, when the vertical screw transporter is rotated by the electric motor 365, the helical blade 361 drives solid particles 320 up the inside of the hollow cylinder 370 towards the top of the tank 310. This creates a free space around the helical blade 361 at the bottom of the hollow cylinder 370, which is filled with the solid particles which surround the outside of the hollow cylinder 370 under the influence of gravity. Hence, as the vertical screw transport 360 turns, the solid particles 320 will tend to circulate; solid particles 320 are driven up the inside of the hollow cylinder 370 by the helical blade 361 before falling back down the outside of the hollow cylinder 370 under gravity.

A set of ceramic members 380 in the bottom of the tank 310 are shaped so as to guide the solid particles 320 to the helical blade 361 underneath the hollow cylinder 370.

Figure 19:
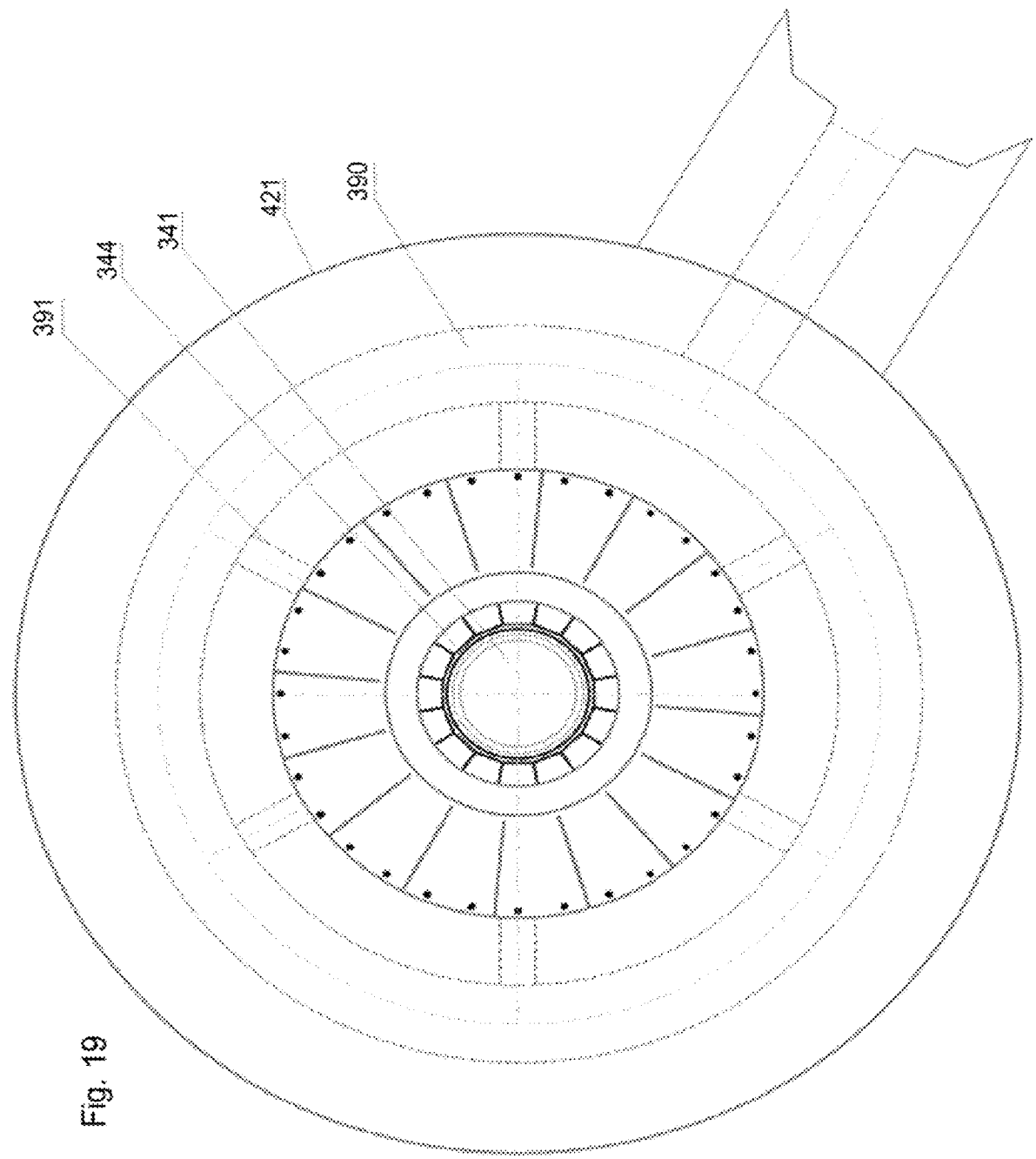

The first solar receiver 300 further comprises a primary outflow pipe 390 and a primary inflow pipe 400, each of which is a toroid, specifically a torus, in the embodiment shown in FIGS. 17 to 19. FIG. 19 shows the first solar receiver 300 from above, with the location of the primary outflow pipe 390 marked on the diagram. The primary outflow pipe 390 is connected to the tank 310 by a plurality of outlets 391, which are arranged radially around the tank 310. Similarly, the primary inflow pipe 400 is connected to the tank 310 by a plurality of inlets 401, which are arranged radially around the tank 310. The primary outflow pipe 390, the outlets 391, the primary inflow pipe 400 and the inlets 401 are filled with working fluid 330. As can be seen in FIG. 19, the primary outflow pipe 390 is connected to a further pipe which leads outside the first solar receiver 300. The primary inflow pipe 340 is also connected to a further pipe which leads outside the first solar receiver 300.

In use, as the solid particles 320 are heated by the light 350, they heat the working fluid 330 which surrounds them by conduction and radiation. The heated working fluid 330 will tend to rise inside the tank 310, creating a convection current. Since the inlets 401 are located at a lower point in the tank than the outlets 391, the convection current tends to draw working fluid 330 in through the inlets 401 from the primary inflow pipe 400, while driving working fluid 330 out through the outlets 391 to the primary outflow pipe 390. In addition, circulation of the working fluid 330 through the tank 310 is driven by one or more external fans or pumps (no shown in the diagrams), which are attached to the pipes.

The tank 310 is surrounded by a thick layer of ceramic wool 410 in order to reduce heat losses. The ceramic wall is contained by a first metal housing 420. The first metal housing is then surrounded by another layer of ceramic wool 411, which also encases the primary outflow pipe 390 and the primary inflow pipe 400, which is itself contained in a second metal housing 421.

The first solar receiver 300 comprises a steel frame 430, which supports the other components of the first solar receiver. The first solar receiver 300 can be moved, and the height of the steel frame 430 can be adjusted, in order to place the first solar receiver 300 in the best position to receive the light 350. Ideally, a common focus 202 of light entering the first solar receiver 300 should be just below the plane of the opening 340 so that the solid particles 320 pass through the common focus 202 when being circulated by the vertical screw transport 360.

The efficiency of the first solar receiver 300 and the temperature of the working fluid 330 leaving the first solar receiver can be regulated at least in part by regulating the speed of rotation of the electric moto 365, and hence the speed of rotation of the vertical screw transport 360. By increasing the rate of rotation of the vertical screw transport 360, the flow of solid particles 320 is increased. This will tend to decrease the temperature of the exposed solid particles 320 at the top of the tank, since each particle is exposed to the light 350 for a shorter period. This both reduces heat losses due to emission of thermal radiation through the opening 340, and decreases the temperature of the working fluid 330 leaving the first solar receiver. In contrast, if the rate of rotation of the vertical screw transport 360 is decreased, the flow of solid particles 320 is also decreased. Hence the temperature of the exposed solid particles 320 at the top of the tank will tend to increase as each particle is exposed to the light 350 for longer. This both increases heat losses due to emission of thermal radiation through the opening 340, and increases the temperature of the working fluid 330 leaving the first solar receiver.

The temperature of the working fluid 330 leaving the first solar receiver 300, and the temperature of the solid particles 320 can also be adjusted by changing the rate of flow of the working fluid 330. This can be done by adjusting the working rate of a fan or pump which drives the working fluid 330 through the tank 310, or by adjusting valves which affect the resistance the working fluid 330 experiences as it flows through the pipes. If the working fluid flows more quickly, it is exposed to the solid particles 320 for a shorter period, and its temperature upon leaving the tank 310 will decrease. The temperature of the solid particles 320 will also tend to decrease due to the increased heat capacity per second of the working fluid 330 flowing over the solid particles 320. Alternatively, if the working fluid flows more slowly, it is exposed to the solid particles 320 for a longer period, and its temperature upon leaving the tank 310 will increase while the temperature of the solid particles 320 will also tend to increase due to the decreased heat capacity per second of the working fluid 330 flowing over the solid particles 320.

The solid particles 320 are both receivers of radiation in the form of light 350 and exchangers for heating up the working fluid 330. The solid particles 320 are made from ceramics based on aluminium silicates or carbides, such as ultra-high-temperature ceramics (UHTCs). The solid particles 320 are resistant to temperatures greater than 1200° C. The solid particles 320 have an absorption coefficient for solar radiation between 0.5 and 1.

The working fluid 330 is air. Air from the atmosphere surrounding the first solar receiver 300 can be drawn or pumped into the primary inflow pipe 390, and then exhausted back into the atmosphere once it has been used. Alternatively, the working fluid may be kept in a closed loop, and be drawn or pumped back into the primary inflow pipe once it has been used. In alternative embodiments, the working fluid 330 may be pure or substantially pure carbon dioxide. In either case, the working fluid is much cheaper, and a leak of working fluid is not as dangerous as a molten salt or a thermal oil.

Figure 20:
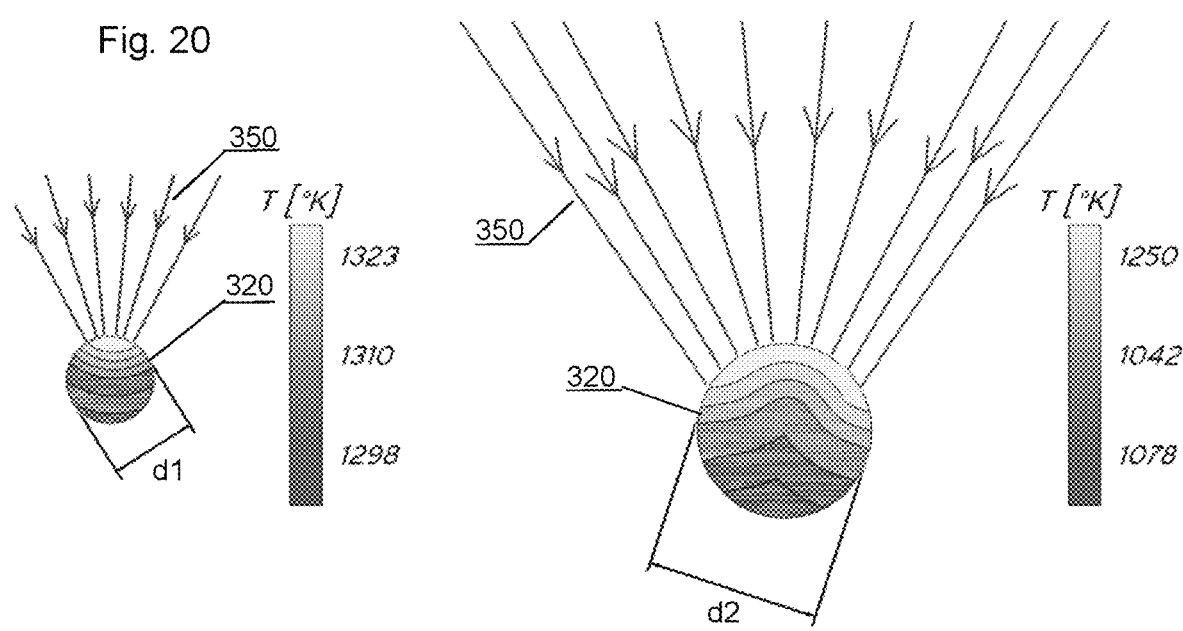
FIG. 20 shows temperature gradients in different solid particles when exposed to solar radiation.

FIG. 20 shows the temperature gradients in two different solid particles 320 in a first solar receiver 300 as described above. One solid particle 320 has diameter d1 and the other has diameter d2. As can be seen from FIG. 20, the larger the diameter of a solid particle 320, the higher the temperature gradient which develops across the particle while it is being heated by the light 350.

In the present embodiment, the diameter of the particles is one at which inner resistance of heat conduction can be neglected. The Biot number is a dimensionless quantity used to describe the ratio between the coefficient of the surface heat transfer and the inner resistance to thermal conductivity in a solid particle 320. The Biot number $B_i$ of a solid particle 320 is defined as:

$$B_i = (\alpha \cdot r)/\lambda$$

where α is the coefficient of the heat transfer from the working fluid 330, r is the radius of the solid particle 320, and λ is the thermal conductivity of the material from which the solid particle 320 is made. To disregard inner resistances, the value of the Biot number should be less than 1. Therefore a maximum radius of the solid particle 320 can be defined on the basis of the known physical properties of both the solid particles 320 and the working fluid 330.

The mean temperature of the solid particles when the first solar receiver 300 is operating is between 950° C. and 1050° C. The working fluid may be heated up to 900° C., or higher if this is desired.

Figure 21:
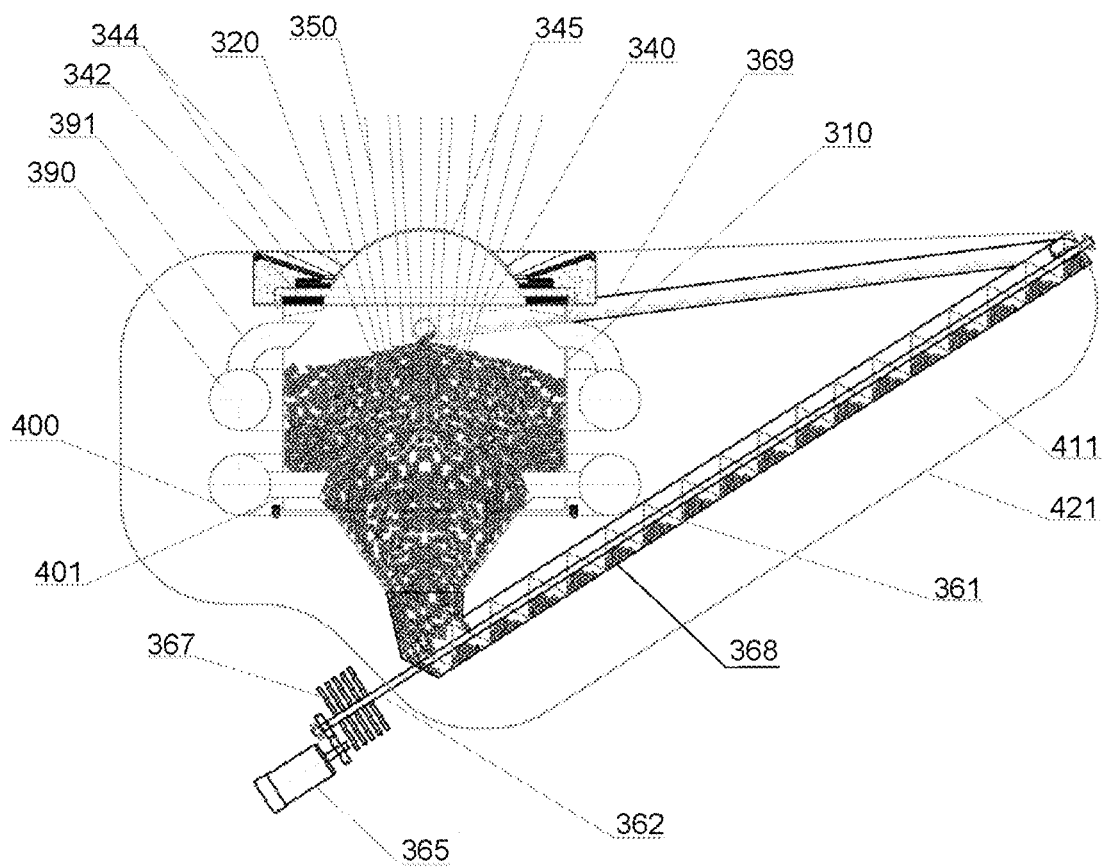
FIGS. 21 and 22 show a second solar receiver according to an embodiment of the invention.
Figure 22:
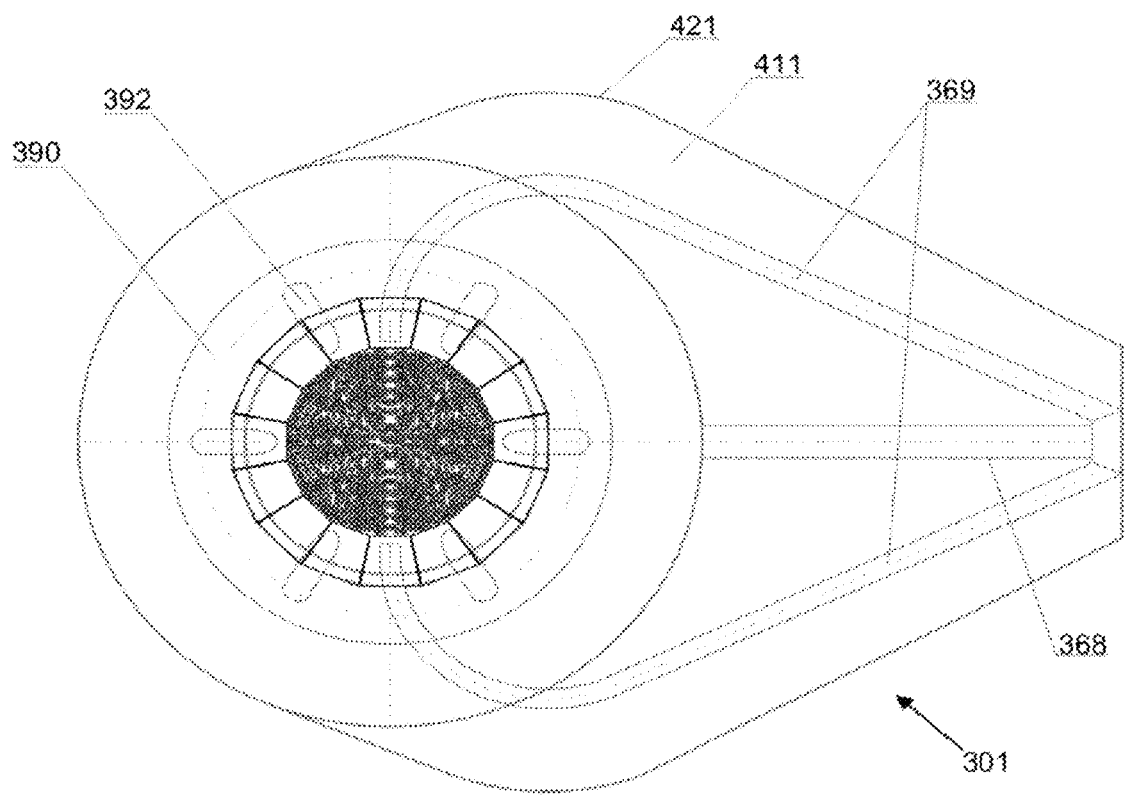

FIGS. 21 and 22 show a second solar receiver 301. Components of the second solar receiver 301 have been given the same reference numbers as components of the first solar receiver 300 where they are alike.

In place of a quartz sheet 341, the second solar receiver 301 comprises a quartz dome 345. Due to its dome shape, the rays of light 350 hit the quartz lens 345 at a less oblique angel, on average. This reduces the amount of the light 350 which is reflected by the quarts, compared to the flat sheet. The dome shape also obstructs the deposition of impurities.

In place of a vertical screw transporter 360, the second solar receiver 301 comprises a slanted screw transporter 368. The slanted screw transporter 368 transports solid particles 320 from the bottom of the tank 310 to a pair of feeder pipes 369. The solid particles travel down the feeder pipes 369 under gravity to re-enter the tank 310.

The primary outflow pipe 390 is positioned lower with respect to tank 310 in the second solar receiver 301 than in the first solar receiver 300, so that it does not obstruct the feeder pipes 369. The outlets 391 are still located at the top of the tank 310, but are curved downwards to reach the primary outflow pipe 390.

Figure 23:
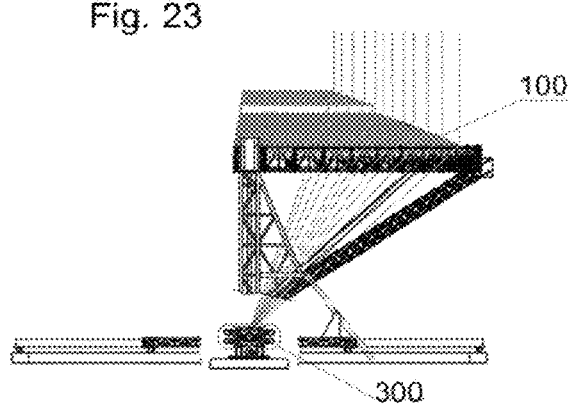
FIGS. 23 to 28 show solar collectors according to embodiments of the invention.
Figure 24:
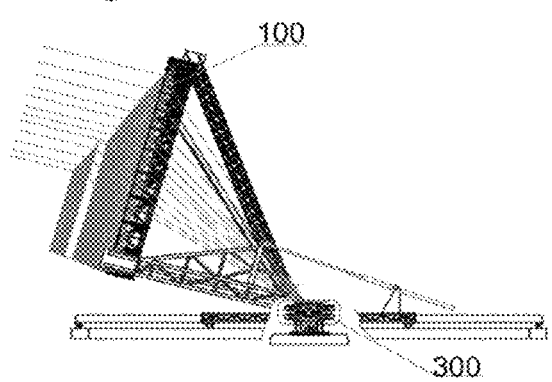

FIGS. 23 and 24 show a solar collector which comprises a first solar concentrator 100 and a solar receiver 300. The solar receiver 300 is placed so that the common focus 202 of the first solar concentrator 100 is located just below the plane of the opening 340.

The solar receiver 300 can be combined with other forms of solar concentrator, such as the second solar concentrator 101.

Figure 25:
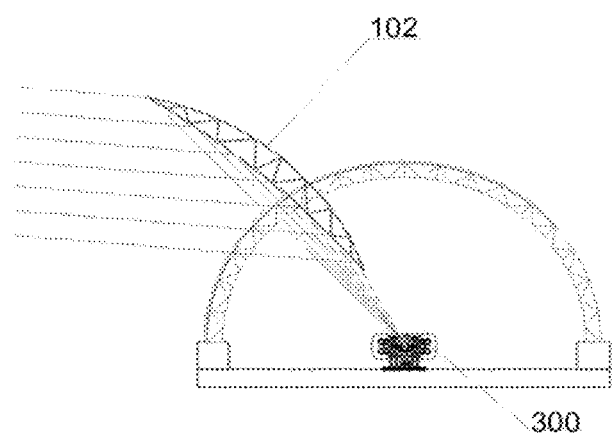
Figure 26:
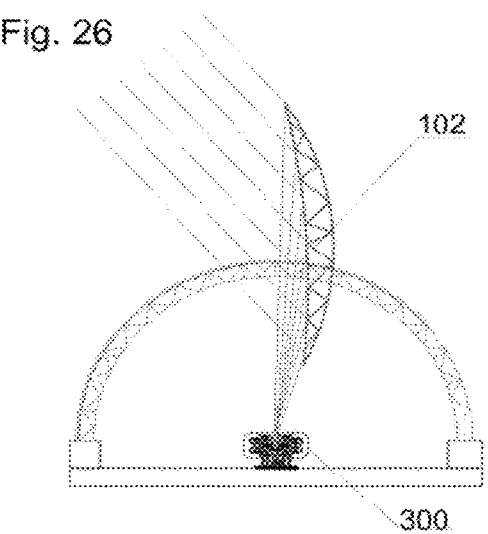

FIGS. 25 and 26 show a first solar receiver 300 which is being used with a fixed point focus parabolic concentrator 102. The fixed point focus parabolic concentrator 102 is guided along two axes in order to direct light towards the first solar receiver 300, which is static and serves to heat up a working fluid as described above.

Figure 27:
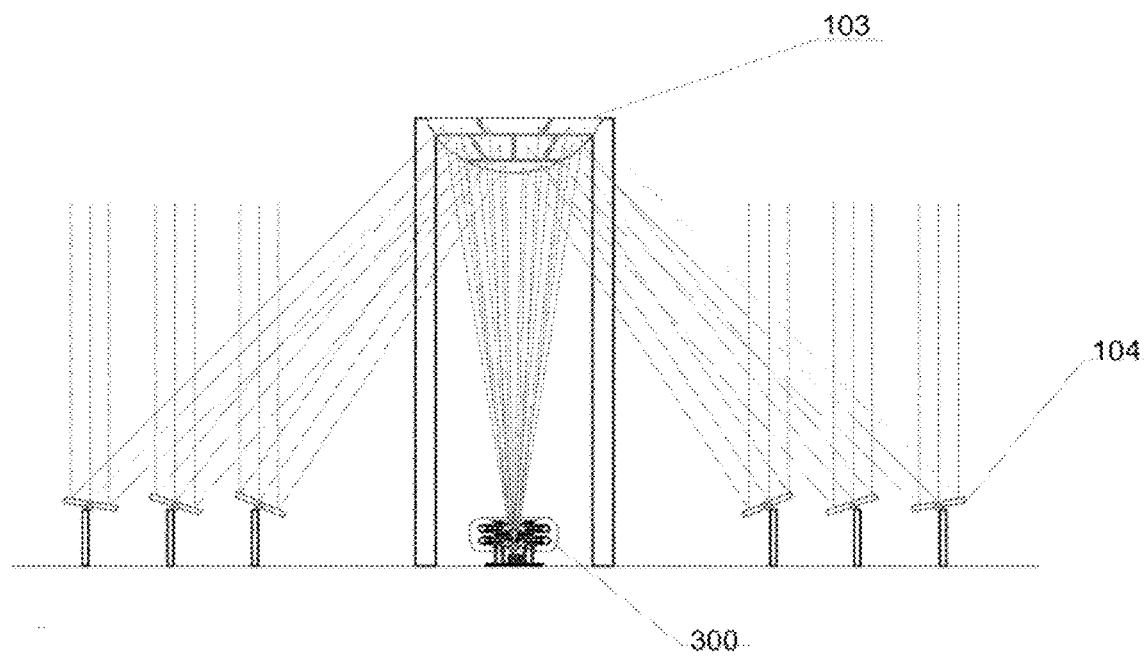

FIG. 27 shows a first solar receiver 300 which is being used with a fixed point focus beam down tower 103. A heliostat field 104 directs light towards the tower, where a secondary mirror directs the light towards the first solar receiver 300.

Figure 28:
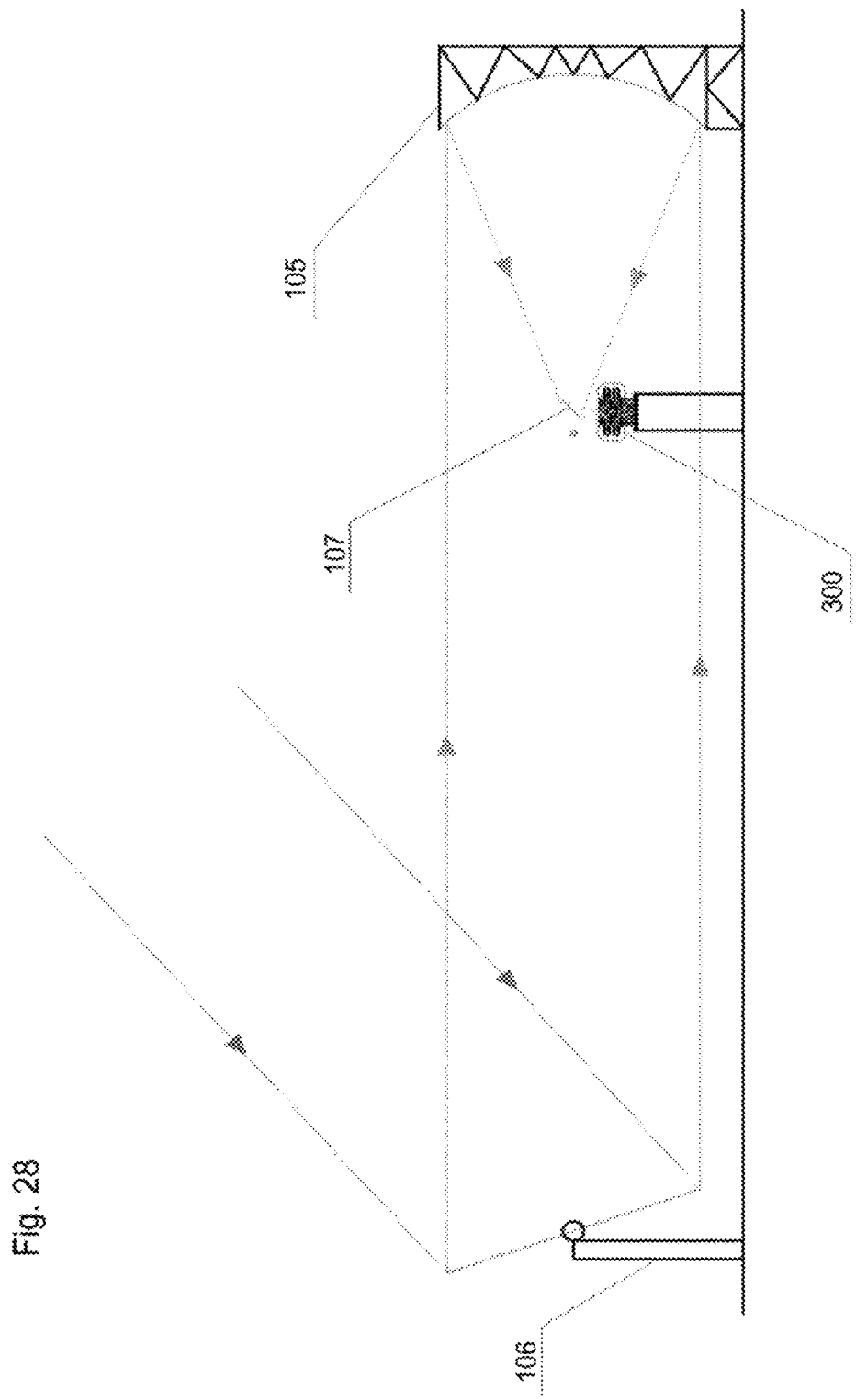

FIG. 28 shows a first solar receiver 300 which is being used with a fixed point solar furnace 105. A heliostat 106 tracks the movement of the sun and directs light towards the solar furnace 105, which focusses the light towards a tertiary mirror 107. The tertiary mirror 107 directs the light into the first solar receiver 300.

Figure 29:
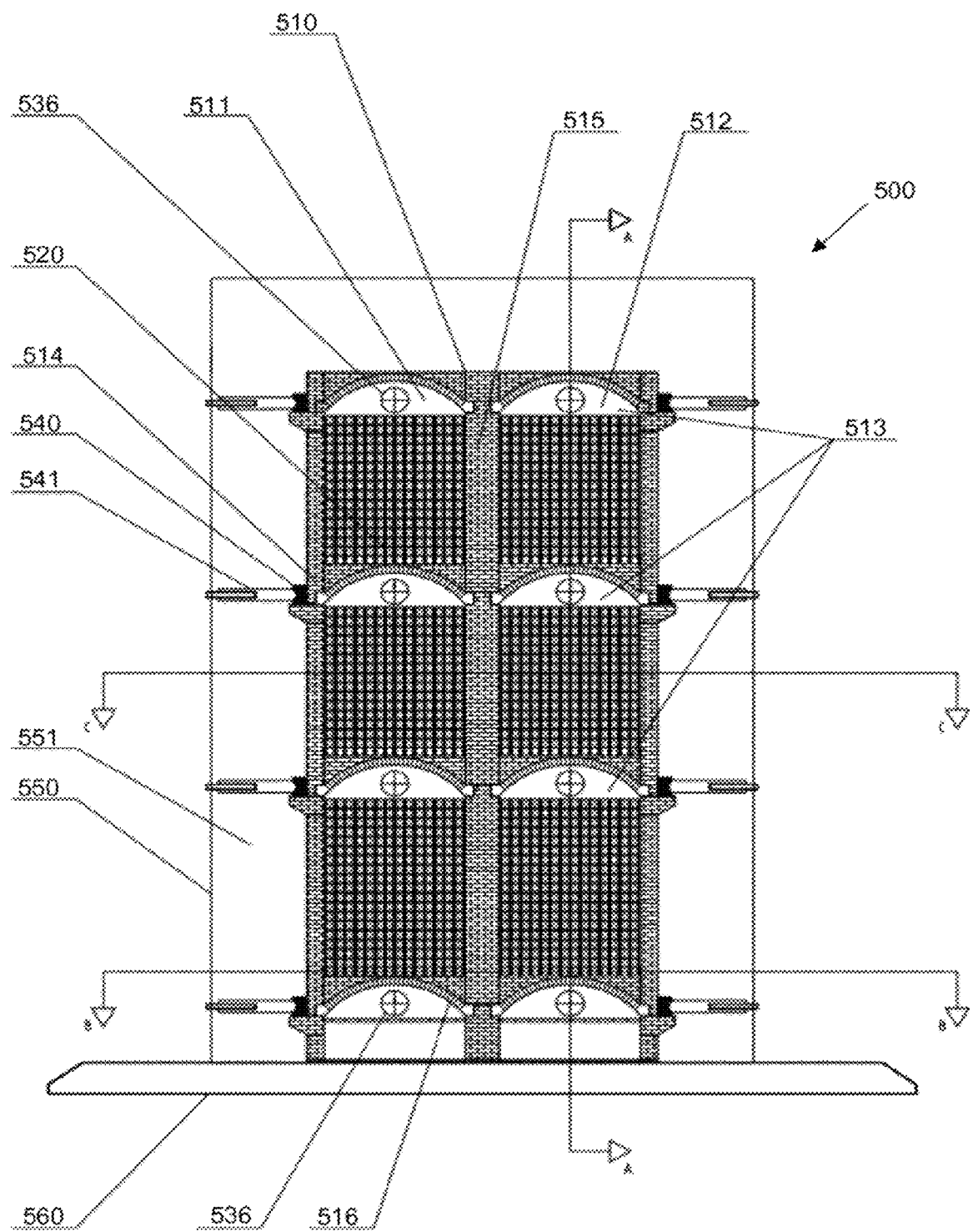
FIGS. 29 to 32 show a thermal energy storage system according to embodiments of the invention.
Figure 30:
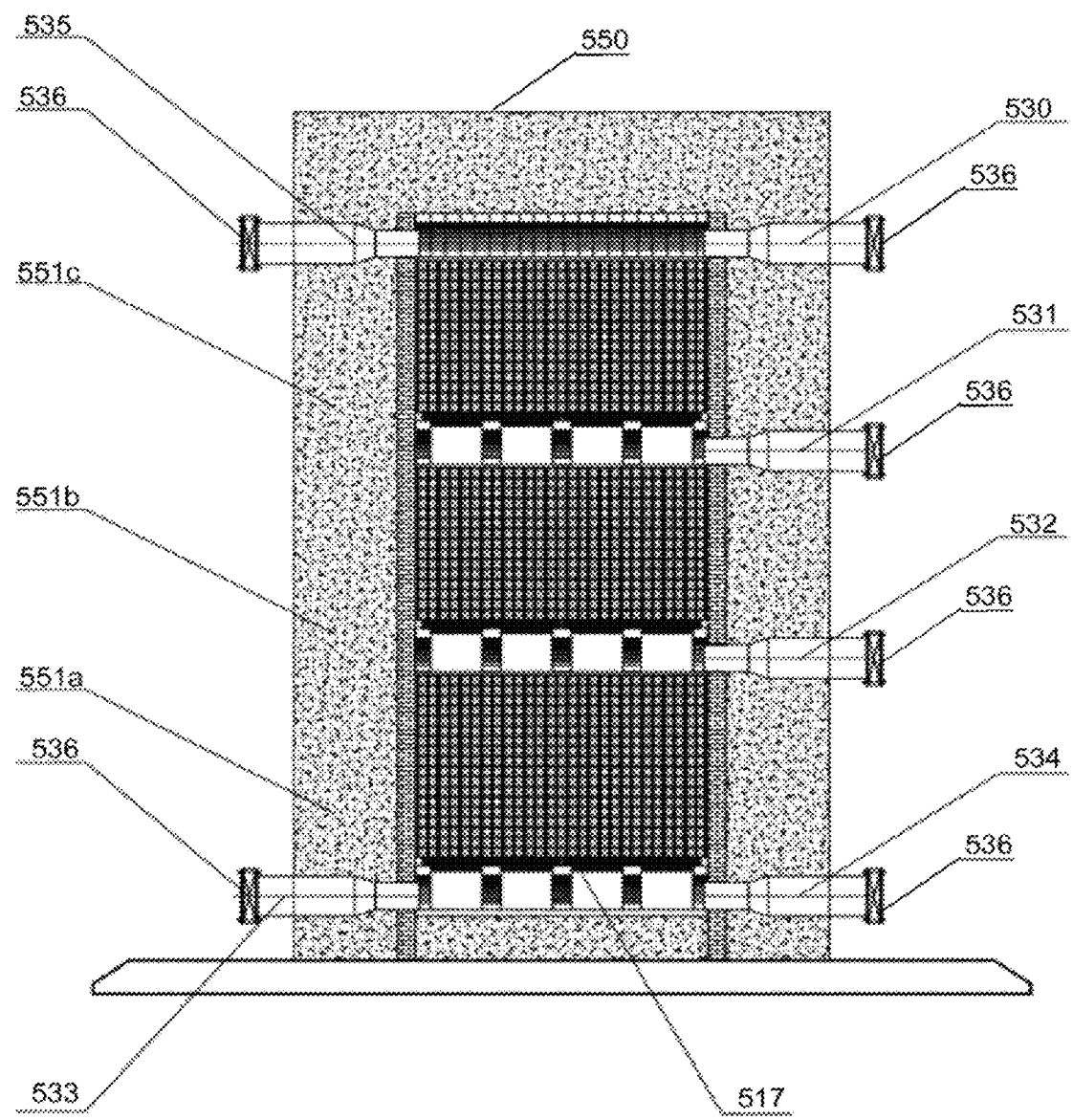
Figure 31:
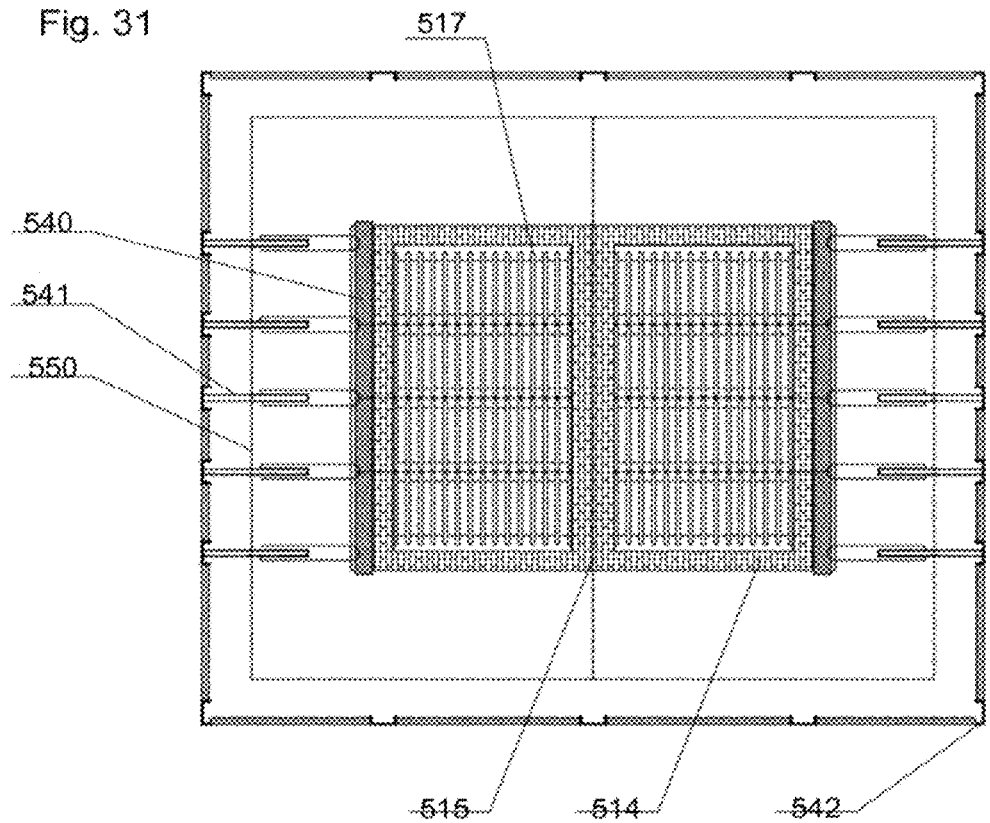
Figure 32:
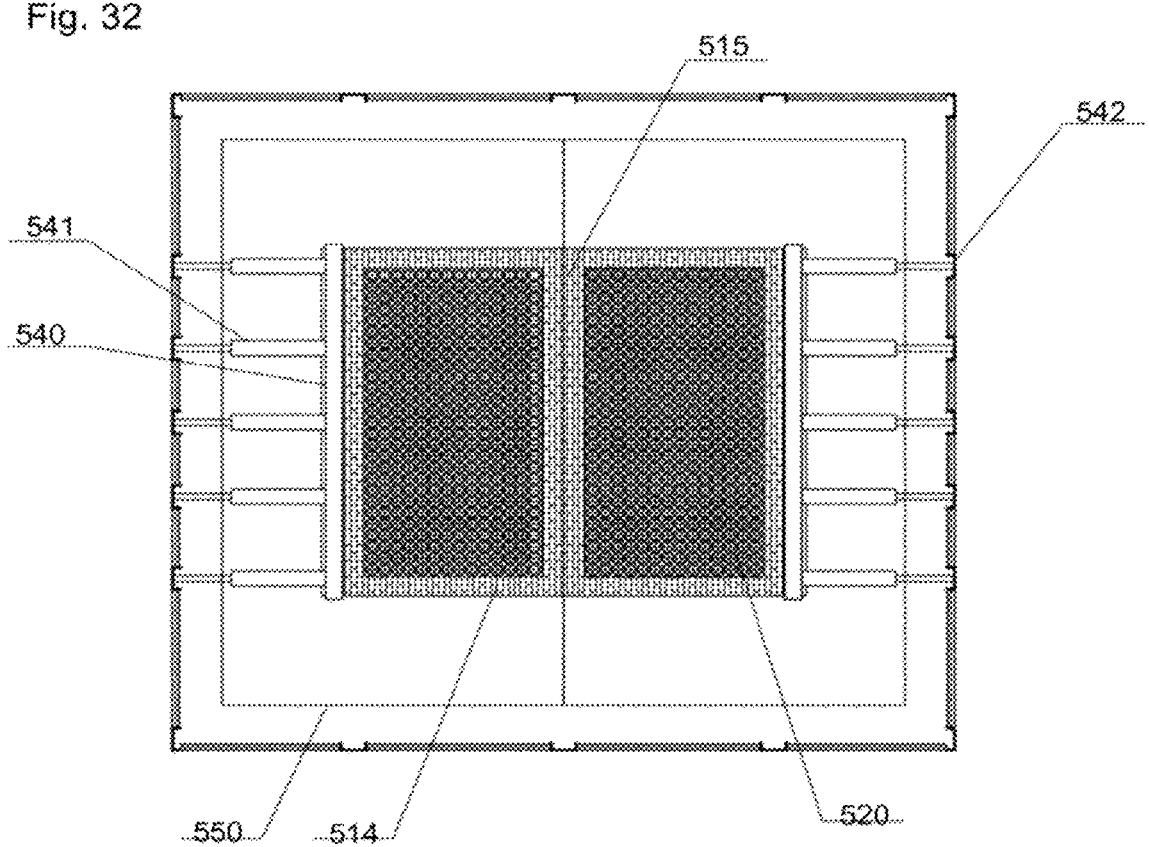

FIGS. 29, 30, 31 and 32 show a thermal energy storage system 500. FIG. 29 shows a first cross-section through the thermal energy storage system, while FIGS. 30, 31 and 32 show further cross sections along lines A-A, B-B and C-C in FIG. 29 respectively. The thermal energy storage system 500 comprises a core 510 which is divided into a left chamber 511 and a right chamber 512. The core is surrounded by a wall 514 which is made from refractory castables. The left chamber 511 is separated from the right chamber 512 by a dividing wall 515 which is also made from refractory castables, and is thick in order to reduce the flow of heat between the left and right chambers 511, 512. Each chamber 511, 512 therefore operates largely independently from the other chamber, and they can be used separately from one another or to store different amounts of heat.

Figure 33:
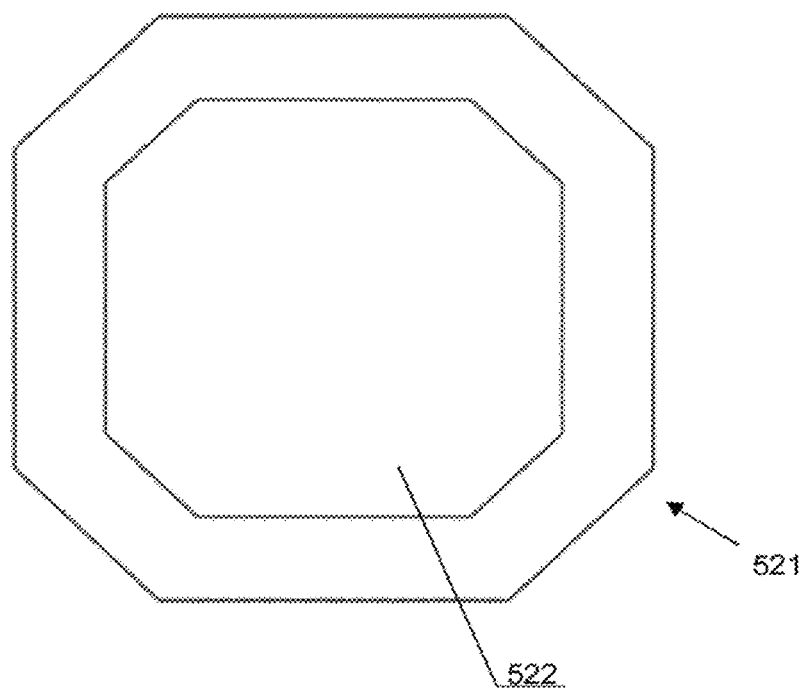
FIGS. 33 and 34 show a checker brick.
Figure 34:
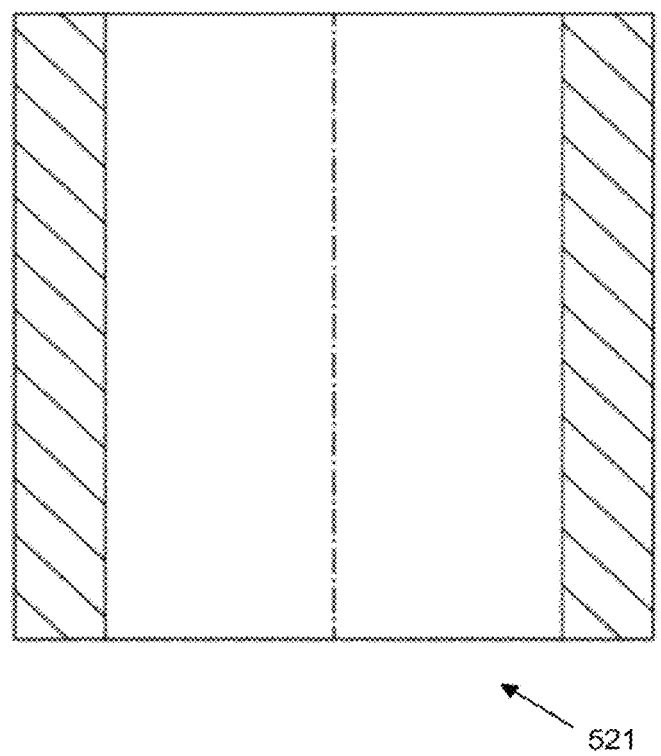

Each chamber 511, 512 is divided into three sections 513, and each section 513 contains a thermal storage mass 520. The thermal storage mass comprises accumulation material in the form of checker bricks 521 which are made from a fireproof material. FIG. 33 shows an example checker brick 521 from the thermal storage mass 520, which comprises a brick with an eight sided perimeter, and a hole 522 formed through the middle of the brick so that it forms a tube. FIG. 34 shows a cross section through the checker brick 521.

The sections 513 are divided by building arches 516 out of refractory castables, and then connecting those arches with riders 517, as can be seen in FIG. 30, which support the weight of the checker bricks 521 above them. The riders are arranged so that they do not prevent the flow of working fluid between the sections 513.

Each section 513 has first, second, third and fourth inlet pipes 530, 531, 532, 533 and first and second outlet pipes 534, 535, which are arranged to allow working fluid 330 in and out of the thermal energy storage system 500. The arches 516 and the checker bricks 521 are arranged such that the working fluid can flow between any inlet and any outlet in the thermal energy storage system 500 by passing through the arches 516 and the holes 522 in the checker bricks 521. Each pipe 530, 531, 532, 533, 534, 535 comprises a valve 536 which controls the flow of working fluid 330 through the pipe.

When the thermal energy storage system 500 is being charged, heated working fluid 330 is pumped in through at least one of the first, second or third inlet pipes 530, 531, 532 using either fans, forced convection or both fans and forced convection. The working fluid 330 flows through the sections 513 and out of the first outlet pipe 534 such that the checker bricks 521 are heated by the working fluid 330. The valves of the fourth inlet pipe 533 and the second outlet pipe 535 are closed so that the working fluid 330 can only leave through the first outlet pipe 534. Over time, the checker bricks 521 are heated by the working fluid such that the thermal energy storage system 500 stores energy.

Usually, the heated working fluid 330 is initially directed through the first inlet pipe 530 which is located towards the top of the thermal energy storage system 500, with respect to gravity. Since the first outlet pipe 534 is located near the bottom of the thermal energy storage system 500, the working fluid 330 must flow through all three sections 513 to reach the outlet. The temperature of the working fluid falls as it passes through the sections 513, and over time the uppermost section achieves the highest temperature.

If the temperature of the working fluid 330 being pumped into the thermal energy storage system 500 falls, for example due to a decrease in the brightness of the sunlight being used to heat the working fluid 330, then it may be desirable to direct the working fluid 330 into the thermal energy storage system 500 through the second inlet pipe 531. Since the second inlet pipe 531 is located beneath the uppermost section of the thermal energy storage system, the working fluid 300 will tend to not flow into the uppermost section, but will instead tend to pass through the middle section and the lowermost section to reach the first outflow pipe 536. Hence, if the working fluid 330 is cooler than the uppermost section, it will not cool the uppermost section, but it will still be able to heat the middle section and the lowermost section.

If the temperature of the working fluid 330 being pumped into the thermal energy storage system 500 falls still further, then it may be desirable to direct the working fluid 330 into the thermal energy storage system 500 through the third inlet pipe 532. Since the third inlet pipe 531 is located beneath the middle section of the thermal energy storage system, the working fluid 300 will tend to not flow into the middle section or the uppermost section, but will instead tend to pass through the lowermost section to reach the first outflow pipe 536. Hence, if the working fluid 330 is cooler than the middle section and the uppermost section, it will not cool the middle section and the uppermost section, but it will still be able to heat the lowermost section.

When the thermal energy storage system 500 is being discharged, cool working fluid 330 is pumped in through the fourth inlet pipe 533 using either fans, forced convection or both fans and forced convection. The working fluid 330 flows through the sections 513 and out of the second outlet pipe 535 such that the working fluid is heated by the checker bricks 521. As the working fluid 330 rises through the checker bricks 521 it rises in temperature, however since the hottest checker bricks 521 are typically located at the top of the thermal energy storage system 500, near the second outlet 535, the working fluid 330 is constantly surrounded by bricks which are hotter than the working fluid, so that it draws thermal energy from the checker bricks 521 throughout its journey through the sections 513. The valves of the first, second and third inlet pipe 530, 531, 532 and the first outlet pipe 535 are closed so that the working fluid 330 can only leave through the second outlet pipe 535. Over time, the checker bricks 521 are cooled by the working fluid such that the thermal energy storage system 500 is depleted of thermal energy.

The wall 514 of which surrounds the core 510 is supported by supporting beams 540, which are in turn held in place by struts 541 which are braced against an outer cage 542 which is visible in FIGS. 31 and 32. The supporting beams 540 are located near the stem, or bottom, of each arch 516 so that they support the arches and help to prevent the arch spreading under the weight of the thermal storage mass 520.

The thermal energy storage system 500 further comprises a covering 550 made from steel plates, which is located between the wall 514 and the outer cage 542. The covering 550 comprises a number of holes through which the struts 541 and the pipes 530, 531, 532, 533, 534, 535 pass. The space between the wall 514 and the covering 550 is filled with an insulating material.

Different materials are used in different layers of the insulating material 551a, 551b, 551c, each layer being arranged at a different average height in the space between the wall 514 and the covering 550, and the choice of insulating material depending upon the expected working temperature at that height. The insulating material in a lower layer 551a, where temperatures may for example range between 200° C. and 300° C., is sand. The insulating material in a middle layer 551b is perlite. The insulating material in an upper layer 551c, where the temperature is highest, is expanded perlite. Using a powder-like insulation such as sand or perlite can obstruct the appearance of micro-convective currents within the insulation. Alternatively, other forms of insulation such as stone wool can be used.

Figure 35:
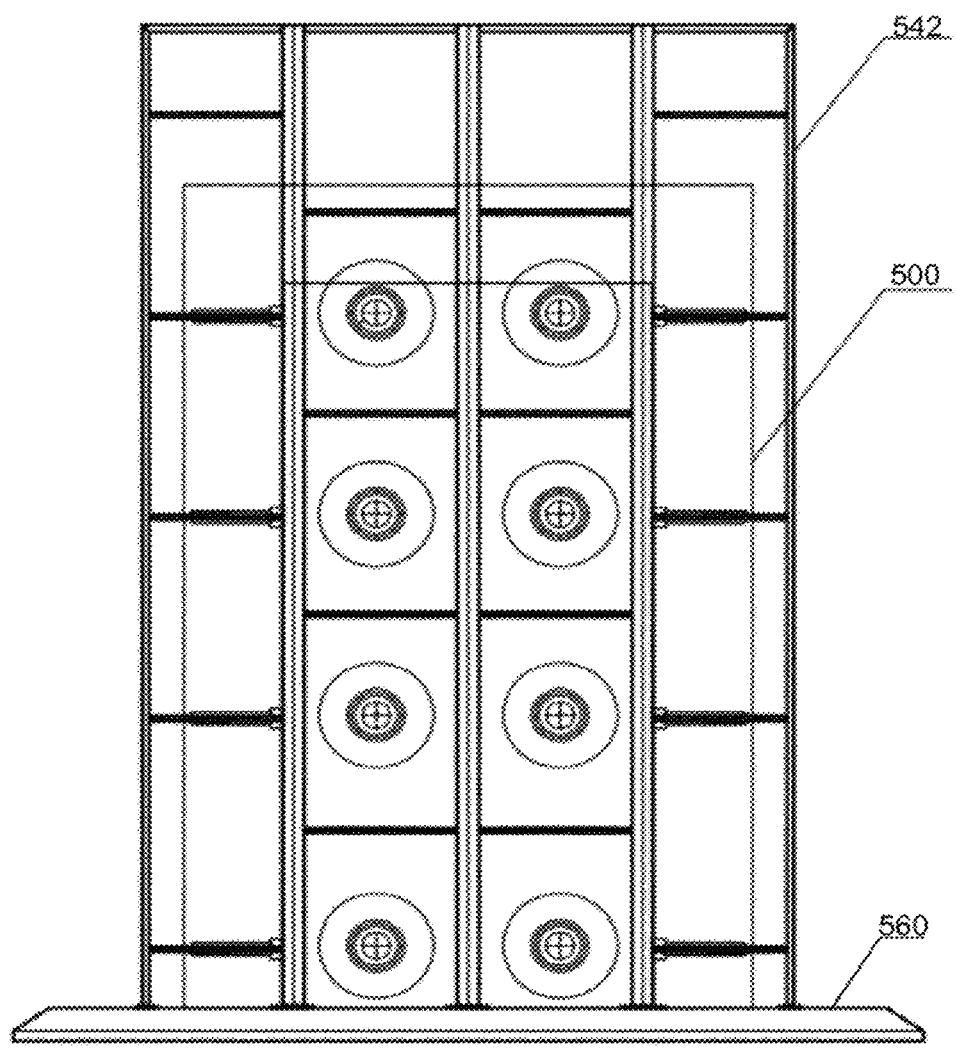
FIGS. 35 and 36 show the thermal energy storage system.
Figure 36:
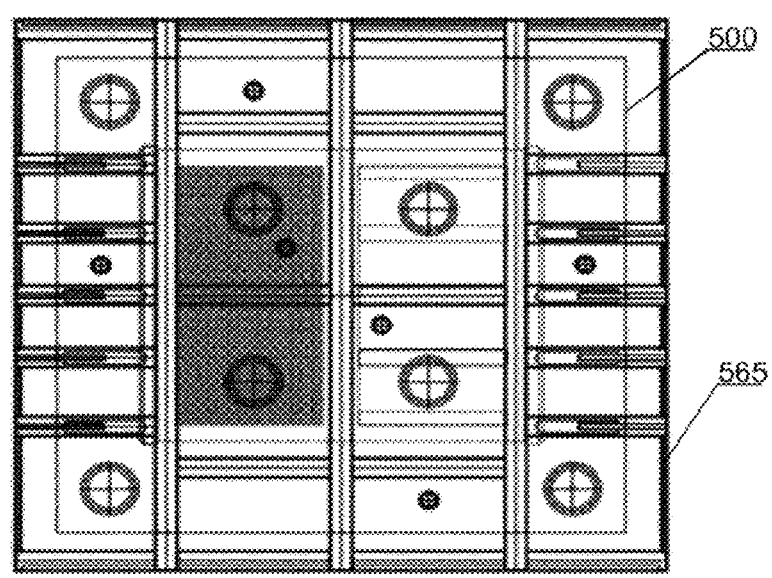

FIGS. 35 and 36 show the thermal energy storage system 500 surrounded by the outer cage 542. The thermal energy storage system 500 and the outer cage 542 share a common base 560. In some embodiments the common base 560 can be mounted on wheels or tracks so that the thermal energy storage system 500 can be relocated as desired.

Figure 37:
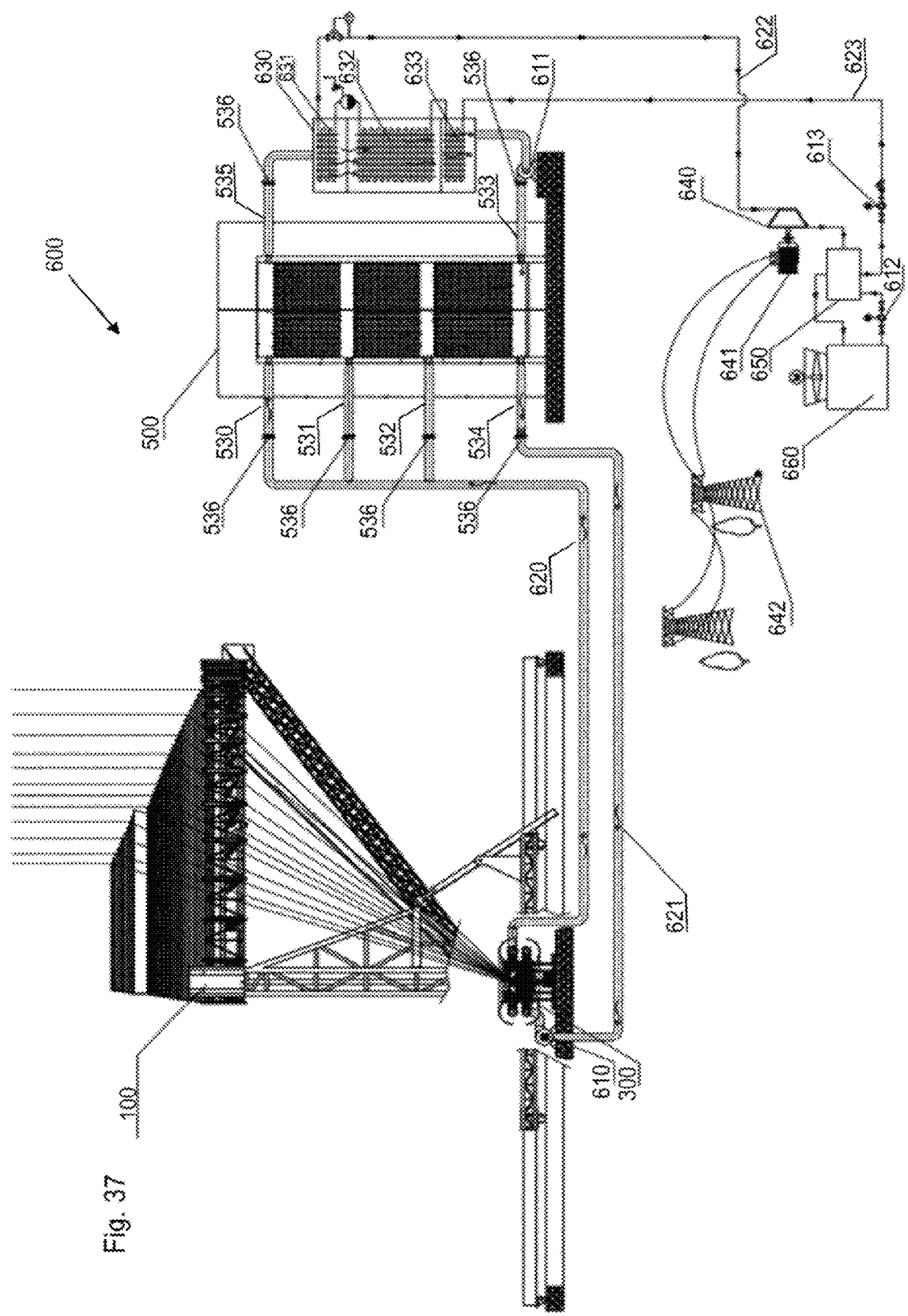
FIG. 37 shows a first Concentrating Solar Power (CSP) system according to an embodiment of the invention.

FIG. 37 shows a first Concentrating Solar Power (CSP) system 600 according to the invention. The CSP comprises a first solar concentrator 100 which is arranged to focus light beams 250 into a first solar receiver 300. The first solar receiver 300 uses air as a working fluid 330, and the air is driven through the first solar receiver 300 by a first CSP fan 610. When the air has been heated it leaves the first solar receiver 300 and flows down a first connecting pipe 620 to a thermal energy storage system 500. The heated air can enter the first energy storage system through the first, second or third inlet pipe, and heats the thermal storage masses 520 in the thermal energy storage system 500. The flow of air through the thermal energy storage system is controlled by valves 536 as described above. Once it has heated the thermal storage masses 520, the temperature of the air drops to less than 250° C., and the air leaves the thermal energy storage system 500 through the first outlet pipe 534. The cooler air flows along a second connecting pipe 621 to the first CSP fan 610, which drives the air into the solar receiver 300 again, so that the process can be repeated. In this way, energy is gathered by the first CSP system 600 and stored as heat in the thermal energy storage system 500. The valves 536 on the fourth inlet 533 and the second outlet 535 are kept closed during this process.

The upper layers of the storage mass, which are closest to the first inlet pipe 530, eventually achieve a maximum working temperature which is the same as or close to the temperature of the air flowing down the first connecting pipe 620. Temperature in the lower layers is typically lower, but in a typical operation the thermal storage mass 520 may be charged until approximately two thirds of the mass is at a maximum working temperature equivalent to or close to the temperature of the air flowing down the first connecting pipe 620.

The heat is discharged from the thermal energy storage system by closing the valves 536 on the first, second and third inlets 530, 531, 532 and the first outlet 534. The valves 536 on the fourth inlet 533 and the second outlet 535 are opened, and a second CSP fan 611 drives air through the fourth inlet 533, so that the air passes up through the thermal storage masses 520 so that the air is heated. The heated air flows out of the second outlet 535 and into a CSP heat exchanger 630. In the heat exchanger, the pipes containing the air exchange heat with pipes containing water so the air is cooled and the water is turned into steam. The cooled air flows back to the second CSP fan 611 so that it can be pumped into the fourth inlet 533 again.

On its way through the CSP heat exchanger 630, the air flows counter to the water and steam, so that the air first superheats existing steam in an first chamber 631, then evaporates preheated water in a second chamber 632, and finally preheats water in a third chamber 633. In this way, the steam is superheated by the air when the air is at its hottest, and as such the highest temperatures of steam can be achieved.

The superheated steam is directed through a steam line 622 to a turbine 640, which drives a generator 641 which supplies electricity to a grid 642. Alternatively, the steam could be used for other applications such as direct heating, if this is desired.

After powering the turbine 640, the steam enters a condenser 650, where it is condensed into water by means of other water which is pumped from a cooling tower 660 by a pump 612. The now condensed water is sent back to the CSP heat exchanger 630 by a high pressure pump 613 along a condensate line 623. Back in the CSP heat exchanger, the water is again preheated, evaporated and superheated by the air from the thermal energy storage system 500, so that the turbine 640 can be continuously driven.

As the temperatures in the thermal energy storage system 500 drop, the temperatures of and hence the energy carried by the air in the CSP heat exchanger 630 will also drop. To compensate for this, and to keep a constant power in the exchanger, the flow of air through the thermal energy storage system can be increased by increasing the rate at which the air is moved by the second CSP fan 611. When the air temperature in the second outlet 535 falls low enough that the needs of the exchanger can no longer be met, air can be supplied from another source such as a second thermal energy storage system, or steam production can be stopped until the first thermal energy storage system 500 is charged again.

The first CSP system 600 can store the heat for a long period of time with little loss. The system may achieve losses as low as 1% a day.

Figure 38:
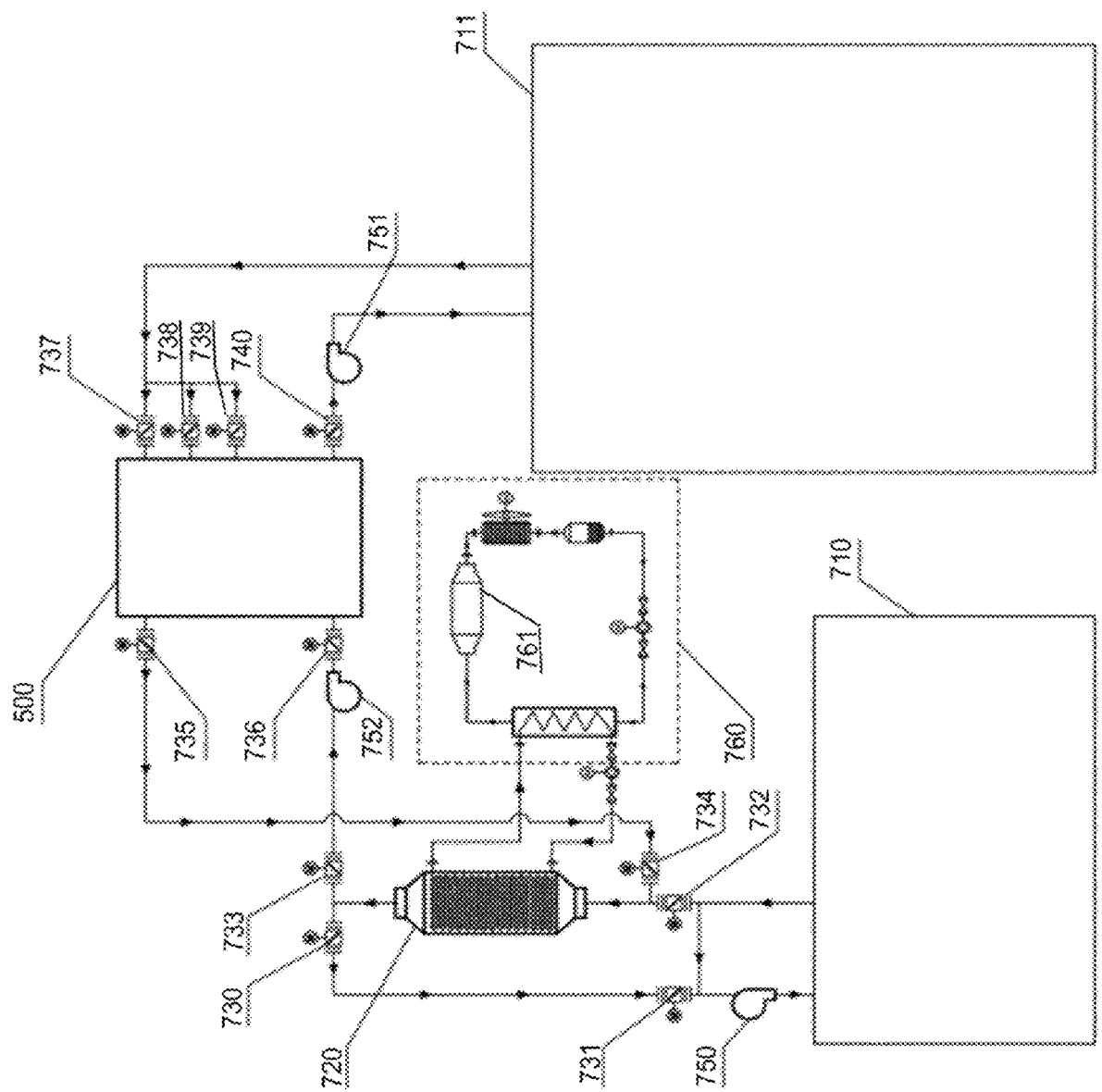
FIG. 38 shows a solar power plant according to an embodiment of the invention.

FIG. 38 shows a solar power plant 700 which comprises a thermal energy storage system 500 as described above. The solar power plant 700 comprises two solar fields 710, 711. The first solar field 710 comprises thirty solar concentrators and has a thermal power of 4.6 MW, which is used to produce heated air. When light is plentiful, and hence heated air can be produced by the first solar field 710, the first, second and third valves 730, 731, 732 are kept open, while the fourth and fifth valves 733, 734 are kept closed. Hence operating a first power plant fan 750 causes air to continuously circulate between the power plant heat exchanger 720 and the first solar field 710.

The second solar field 711 comprises sixty eight concentrators and has a thermal power of 10.4 MW. Also when light is plentiful, so that the second solar field 711 can produce heated air, the sixth and seventh valves are kept closed and the eighth, ninth, tenth and eleventh valves 737, 738, 739, 740 are arranged so that operating a second power plant fan causes air to continuously circulate between the thermal energy storage system 500 and the second solar field 711. This is done by opening the eleventh valve 751 and at least one of the eighth, ninth and tenth valves 737, 738, 739. Hence heated air is supplied to the thermal energy storage system 500, which can then store thermal energy as described above, charging the thermal energy storage system 500.

When there is insufficient light for the solar fields 710, 711 to function at a required capacity, for example due to adverse weather or the onset of night, the solar power plant 700 operates differently. The first, second, third, eighth, ninth, tenth and eleventh valves 730, 731, 732, 737, 738, 739, 740 are all closed, and the fourth, fifth, sixth and seventh valves 733, 734, 735, 736 are all opened so that operating a third power plant fan 752 causes air to circulate between the thermal energy storage system 500 and the power plant heat exchanger 720.

In this way, the power plant heat exchanger 720 is supplied with heated air continuously, either directly from the first solar field 710, or indirectly via the thermal energy storage system 500 from the second solar field 711. The power plant heat exchanger 720 provides steam to an electricity production facility 760 which comprises a turbine 761 such as an Organic Rankine Cycle (ORC) turbine. Therefore electricity is generated continuously, even when the sun goes down.

Figure 39:
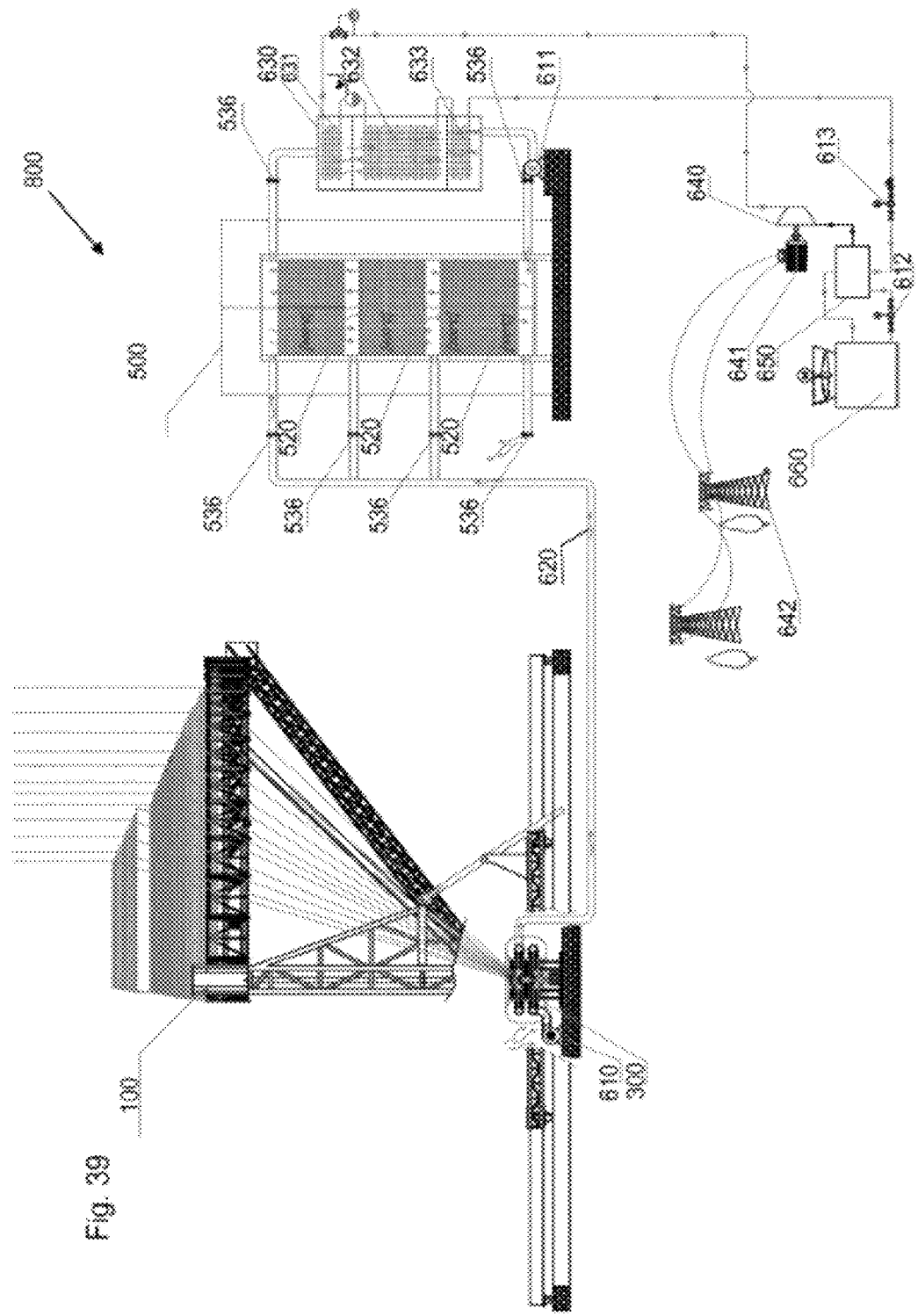
FIG. 39 shows a second CSP system according to an embodiment of the invention.

FIG. 39 shows a second CSP system 800. The second CSP system 800 is similar to the first CSP system 600, and like parts are given like labels. The second CSP system 800 does not comprise a second connecting pipe 621. Instead, the first CSP fan 610 draws air directly from the surrounding atmosphere, and the air is back into the atmosphere from the first outlet 534 once it has been used to heat the thermal storage mass 520. The operating temperatures of different layers of the thermal energy storage system 500 are indicated in FIG. 39. In an upper section, the thermal storage mass 520 will typically reach approximately 900° C. In a middle section, the thermal storage mass 520 will typically reach approximately 600° C. In a lower section, the thermal storage mass 520 will typically reach between 100° C. and 200° C. Air passing through the storage mass 520 when the thermal energy storage system 500 is discharging will reach temperatures of between 400° C. and 800° C., depending on the temperatures of the thermal storage mass 520.

Figure 40:
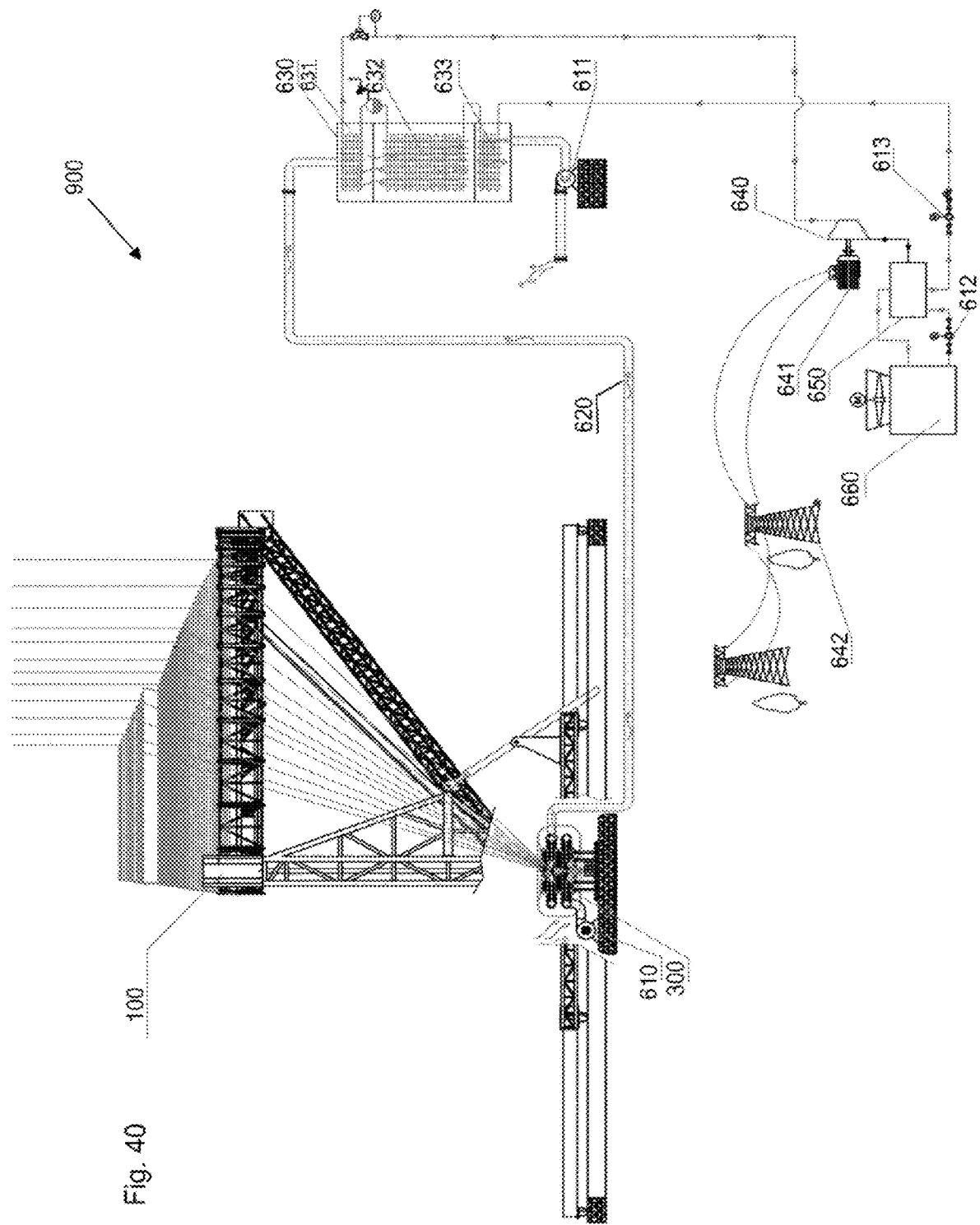
FIG. 40 shows a third CSP system according to an embodiment of the invention.

FIG. 40 shows a third CSP system 900. The third CSP system 900 is similar to the second CSP system 800 and the first CSP system 600, and like parts are given like labels. The third CSP system 900 does not comprise a second connecting pipe 621, and also does not comprise a thermal energy storage system 500. Air is drawn from the atmosphere by the first CSP fan 621 and heated in the solar collector 300, before flowing directly into the CSP heat exchanger 630. After passing through the CSP heat exchanger, the now cooled air is vented back into the atmosphere via a ventilator 910

The steam produced in any of the heat exchangers described above could be provided to an existing power plant, such as an existing fossil fuel power plant, and used to drive the turbines of the plant in place of steam created by burning fossil fuels. In this way, a CSP system comprising at least a solar concentrator and a collector can be used to convert existing power plants to produce greener power. FIG. 41 shows a fourth CSP system 1000. The further CSP system 1000 is similar to the third CSP system 900, the second CSP system 800 and the first CSP system 600, and like parts are given like labels. Steam from the heat exchanger 630 is supplied to what was a fossil fuel burning power station 1010, which produces electricity.

CSP systems such as the ones described above use gas as a working fluid, typically air but potentially also CO2 or other gasses if this is required. These systems can work at considerably higher temperatures, since gasses do not have upper limits to their working temperatures. Embodiment of the invention as described above can function at temperatures higher than 700° C.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

We claim as follows:

1. A thermal energy storage system comprising:
   a container which comprises at least a first inlet, a second inlet and a third inlet for admitting fluid into the container and at least a first outlet and a second outlet for admitting fluid out of the container; and
   a solid thermal storage mass contained within the container,
   wherein each of the outlets and inlets is located at a height relative to gravity in use, such that the height of the first inlet is greater than the height of the second inlet, the height of the second inlet is greater than the height of the first outlet,
      wherein the solid thermal storage mass comprises a plurality of openings such that the fluid can pass at least between the first inlet and the first outlet, between the second inlet and the first outlet, and between the third inlet and the second outlet by passing through the openings,
   wherein the height of the second outlet is greater than the height of the third inlet, wherein the system further comprises a plurality of valves which control fluid flow through the inlets and outlets such that when the valves are in a first configuration in use the fluid enters the container via the first or second inlet and exits the container via the first outlet and when the valves are in a second configuration in use the fluid enters the container via the third inlet and exits the container via the second outlet.

2. A thermal energy storage system as claimed in claim 1, wherein the system further comprises an insulating layer which surrounds the container.

3. A thermal energy storage system as claimed in claim 2, wherein the insulating layer comprises a particulate insulation material.

4. A thermal energy storage system as claimed in claim 1, wherein the container comprises a fourth inlet, and wherein the height of the second inlet is greater than the height of the fourth inlet, and the height of the fourth inlet is greater than the height of the first outlet.

5. A thermal energy storage system as claimed in claim 1, wherein the fluid is a gas.

6. A thermal energy storage system as claimed in claim 4, wherein the fluid is air.

7. A thermal energy storage system as claimed in claim 1, wherein the solid thermal storage mass comprises porous material.

8. A thermal energy storage system as claimed in claim 1, wherein the solid thermal storage mass comprises a plurality of bricks.

9. A thermal energy storage system as claimed in claim 1, wherein the system comprises a heat exchanger, the heat exchanger being connected to the third inlet and the second outlet.

10. A thermal energy storage system as claimed in claim 1, wherein the system comprises a plurality of solid thermal storage masses contained within the container, wherein a first solid thermal storage mass is separated from a second solid thermal storage mass by a first member.

11. A method of operating a thermal energy storage system, the method comprising:
    providing a thermal energy storage system comprising:
       a container which comprises at least a first inlet, a second inlet and a third inlet for admitting fluid into the container and at least a first outlet and a second outlet for admitting fluid out of the container; and
       a solid thermal storage mass contained within the container,
    wherein each of the outlets and inlets is located at a height relative to gravity in use, such that the height of the first inlet is greater than the height of the second inlet, the height of the second inlet is greater than the height of the first outlet,
       wherein the solid thermal storage mass comprises a plurality of openings such that the fluid can pass at least between the first inlet and the first outlet, between the second inlet and the first outlet, and between the third inlet and the second outlet by passing through the openings;
    directing a fluid through the first inlet so that it passes through the solid thermal storage mass and out of the first outlet when the temperature of the fluid is greater than the temperature of an upper part of the solid thermal storage mass; and
    directing the fluid through the second inlet so that it passes through the solid thermal storage mass and out of the first outlet when the temperature of the fluid is less than the temperature of the upper part of the solid thermal storage mass.

12. A concentrating solar power system comprising a solar collector, the solar collector comprising at least one mirror and a solar receiver, the mirror being arranged to direct solar radiation into the solar receiver such that the solar radiation heats up a fluid in the solar receiver,
    wherein the concentrating solar power system further comprises a thermal energy storage system according to claim 1, and wherein the thermal energy storage system is connected to the solar receiver such that heat from the fluid in the solar receiver can be stored in the thermal energy storage system.

13. The method of claim 11 wherein in the thermal energy storage system
    the height of the second outlet is greater than the height of the third inlet, and wherein the system further comprises a plurality of valves which control fluid flow through the inlets and outlets such that when the valves are in a first configuration in use the fluid enters the container via the first or second inlet and exits the container via the first outlet and when the valves are in a second configuration in use the fluid enters the container via the third inlet and exits the container via the second outlet.

\* \* \* \* \*